US010307873B2

(12) United States Patent
Hucker et al.

(10) Patent No.: US 10,307,873 B2
(45) Date of Patent: Jun. 4, 2019

(54) METHOD OF ASSEMBLING AN ANNULAR COMBUSTION CHAMBER ASSEMBLY

(71) Applicant: ROLLS-ROYCE plc, London (GB)

(72) Inventors: Paul A. Hucker, Bristol (GB); Eliot Burrows, Nottingham (GB)

(73) Assignee: ROLLS-ROYCE plc, London (GB)

( * ) Notice: Subject to any disclaimer, the term of this patent is extended or adjusted under 35 U.S.C. 154(b) by 85 days.

(21) Appl. No.: 15/642,973

(22) Filed: Jul. 6, 2017

(65) Prior Publication Data
US 2018/0036843 A1 Feb. 8, 2018

(30) Foreign Application Priority Data

Aug. 2, 2016 (GB) .................................. 1613299.5

(51) Int. Cl.
*B23P 15/00* (2006.01)
*F23R 3/00* (2006.01)
(Continued)

(52) U.S. Cl.
CPC ............ *B23P 15/008* (2013.01); *F23R 3/002* (2013.01); *F23R 3/007* (2013.01); *F23R 3/50* (2013.01);
(Continued)

(58) Field of Classification Search
CPC .......... B23P 15/008; F23R 3/60; F23R 3/007; F23R 3/002; F23R 3/50;
(Continued)

(56) References Cited

U.S. PATENT DOCUMENTS

| 4,614,082 A | 9/1986 | Sterman et al. |
| 6,449,952 B1 | 9/2002 | Emilianowicz et al. |

(Continued)

FOREIGN PATENT DOCUMENTS

| EP | 497519 A1 | 8/1992 |
| GB | 2 432 902 A | 6/2007 |

OTHER PUBLICATIONS

Dec. 1, 2017 Extended European Search Report issued in European Patent Application No. 17179830.9.
(Continued)

*Primary Examiner* — Jason L Vaughan
*Assistant Examiner* — Amanda J Kreiling
(74) *Attorney, Agent, or Firm* — Oliff PLC

(57) ABSTRACT

A method of assembling an annular combustion chamber assembly comprises positioning a plurality of first combustion chamber segments circumferentially side by side to form an annulus and removably securing the downstream end of each first combustion chamber segment to a first ring to form a first assembly. The method comprises positioning a plurality of second combustion chamber segments circumferentially side by side to form an annulus, removably securing the downstream end of each second combustion chamber segment to a second ring to form a second assembly. The method comprises removably securing the upstream end of each second combustion chamber segment of the second assembly to an annular upstream end wall. The method comprises inserting the second assembly into the first assembly and then removably securing the upstream end of each first combustion chamber segment of the first assembly to the annular upstream end wall to form the annular combustion chamber assembly.

18 Claims, 13 Drawing Sheets

(51) Int. Cl.
  *F23R 3/50*  (2006.01)
  *F23R 3/60*  (2006.01)
(52) U.S. Cl.
  CPC ...... *F23R 3/60* (2013.01); *F23R 2900/00017* (2013.01)
(58) Field of Classification Search
  CPC ....... F23R 2900/00017; Y10T 29/4932; Y10T 29/49321; Y10T 29/49323; Y10T 29/4933; Y10T 29/49826; Y10T 29/49904; F02C 7/20
  See application file for complete search history.

(56) References Cited

U.S. PATENT DOCUMENTS

| | | |
|---|---|---|
| 2006/0179770 A1 | 8/2006 | Hodder |
| 2007/0186559 A1 | 8/2007 | De Sousa et al. |
| 2016/0010869 A1 | 1/2016 | Bake et al. |

OTHER PUBLICATIONS

Dec. 28, 2016 Search Report issued in Birtish Patent Application No. 1613299.5.

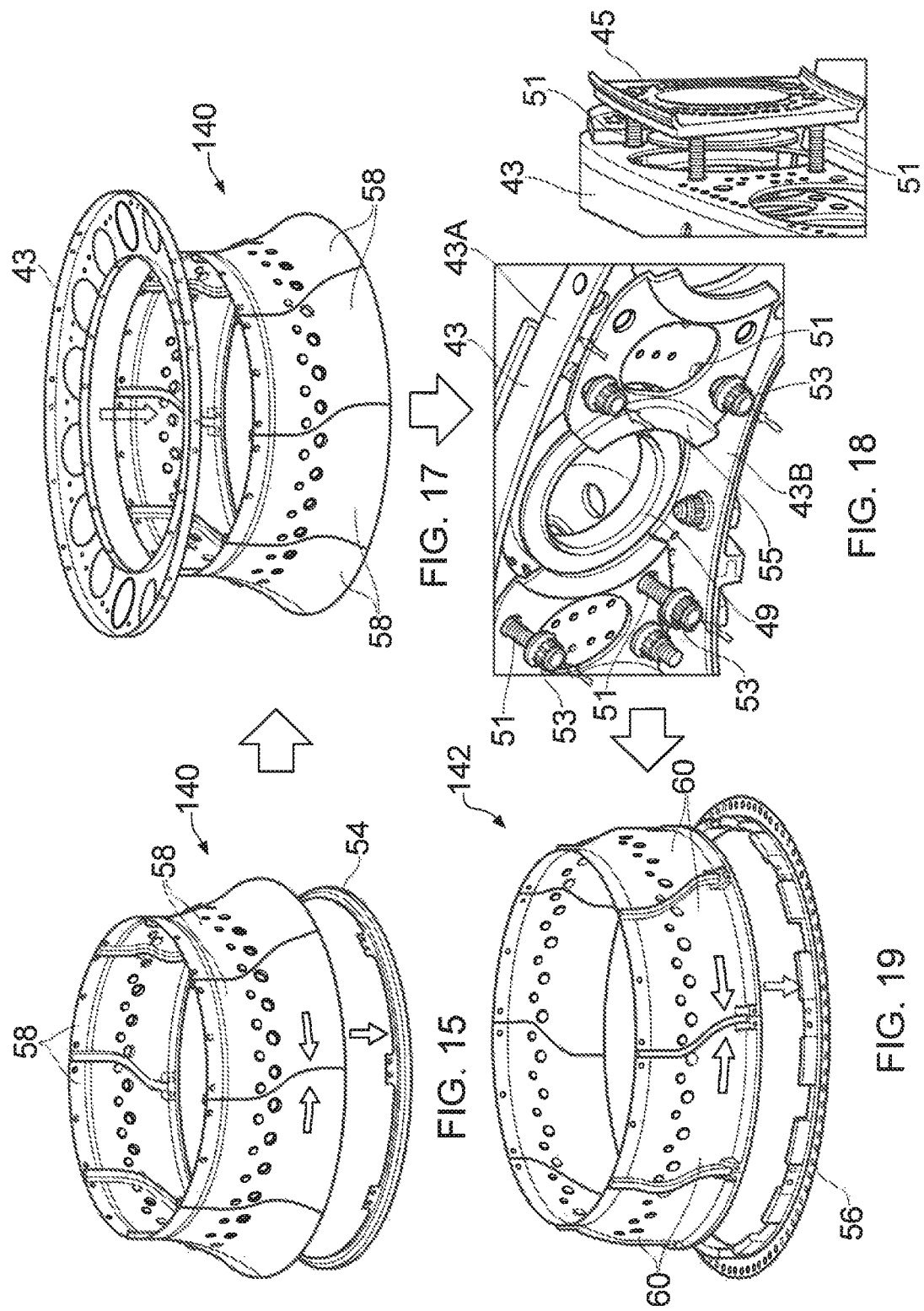

METHOD OF ASSEMBLING AN ANNULAR COMBUSTION CHAMBER ASSEMBLY

The present disclosure concerns a method of assembling an annular combustion chamber assembly and in particular to a method of assembling an annular combustion chamber assembly for a gas turbine engine.

According to a first aspect of the present disclosure there is provided a method of assembling an annular combustion chamber assembly, the annular combustion chamber comprising an annular upstream end wall, a radially outer annular wall, a radially inner annular wall, a first ring and a second ring, the first ring having a greater diameter than the second ring, the radially outer annular wall comprising a plurality of first combustion chamber segments and the radially inner annular wall comprising a plurality of second combustion chamber segments, the method comprising the steps of:

a) positioning the first combustion chamber segments circumferentially side by side to form an annulus and removably securing the downstream end of each first combustion chamber segment to the first ring to form a first assembly, b) positioning the second combustion chamber segments circumferentially side by side to form an annulus, removably securing the downstream end of each second combustion chamber segment to the second ring to form a second assembly, c) locating the second assembly within the first assembly, d) removably securing the upstream end of each second combustion chamber segment of the second assembly to the annular upstream end wall, and e) removably securing the upstream end of each first combustion chamber segment of the first assembly to the annular upstream end wall.

The method may comprise removably securing the upstream end of each second combustion chamber segment of the second assembly to the annular upstream end wall before locating the second assembly into the first assembly, and removably securing the upstream end of each first combustion chamber segment of the first assembly to the annular upstream end wall after locating the second assembly into the first assembly to form the annular combustion chamber.

The method may comprise removably securing the upstream end of each first combustion chamber segment of the first assembly to the annular upstream end wall before locating the second assembly into the first assembly, and removably securing the upstream end of each second combustion chamber segment of the second assembly to the annular upstream end wall after locating the second assembly into the first assembly to form the annular combustion chamber assembly.

The method may comprise locating the second assembly within the first assembly before removably securing the upstream end of each second combustion chamber segment of the second assembly to the annular upstream end wall and before removably securing the upstream end of each first combustion chamber segment of the first assembly to the annular upstream end wall.

The method may comprise positioning the upstream end wall between the upstream ends of the second combustion chamber segments and the upstream ends of the first combustion chamber segments before securing the upstream end of each second combustion chamber segment of the second assembly to the annular upstream end wall and before removably securing the upstream end of each first combustion chamber segment of the first assembly to the annular upstream end wall.

Step a) may comprise removably fastening each first combustion chamber segment to the first ring. Step b) may comprise removably fastening each second combustion chamber segment to the second ring.

Step a) may comprise bolting each first combustion chamber segment to the first ring. Step b) may comprise bolting each second combustion chamber segment to the second ring.

Step d) may comprise removably fastening each second combustion chamber segment to the annular upstream end wall. Step e) may comprise removably fastening each first combustion chamber segment to the annular upstream end wall.

Step d) may comprise bolting each second combustion chamber segment to the annular upstream end wall. Step e) may comprise bolting each first combustion chamber segment to the annular upstream end wall.

The annular upstream end wall may have a plurality of circumferentially spaced fuel injector apertures, the method may comprise providing a plurality of heat shields, each heat shield having an aperture, aligning the aperture of each heat shield with a respective one of the fuel injector apertures in the annular upstream end wall and removably securing each heat shield to the annular upstream end wall.

The method may comprise removably fastening each heat shield to the annular upstream end wall.

The method may comprise bolting each heat shield to the annular upstream end wall.

The method may comprise removably fastening the heat shields to the annular upstream end wall before removably securing the upstream end of each second combustion chamber segment of the second assembly to the annular upstream end wall, removably securing the upstream end of each second combustion chamber segment of the second assembly to the annular upstream end wall before locating the second assembly into the first assembly, and removably securing the upstream end of each first combustion chamber segment of the first assembly to the annular upstream end wall after locating the second assembly into the first assembly to form the annular combustion chamber.

The method may comprise removably securing the upstream end of each second combustion chamber segment of the second assembly to the annular upstream end wall before removably fastening the heat shields to the annular upstream end wall, removably fastening the heat shields to the annular upstream end wall before locating the second assembly into the first assembly, and removably securing the upstream end of each first combustion chamber segment of the first assembly to the annular upstream end wall after locating the second assembly into the first assembly to form the annular combustion chamber.

The method may comprise removably fastening the heat shields to the annular upstream end wall before locating the second assembly within the first assembly, removably securing the upstream end of each second combustion chamber segment of the second assembly to the annular upstream end wall and removably securing the upstream end of each first combustion chamber segment of the first assembly to the annular upstream end wall after locating the second assembly within the first assembly.

Each first combustion chamber segment may comprise a rigid frame, the rigid frame has a first hook at a first circumferential end of the first combustion chamber segment and a second hook at a second circumferential end of the first combustion chamber segment, the first hook extends circumferentially away from the first combustion chamber segment, the second hook forms a slot with the frame, step a) may comprise positioning the first hook of each first combustion chamber segment into the slot of a circumferentially adjacent first combustion chamber segment.

Step a) may comprise moving the first combustion chamber segments axially and/or circumferentially such that the first hook of each first combustion chamber segment locates into the slot of a circumferentially adjacent first combustion chamber segment.

Each first combustion chamber segment may comprise an inner wall and an outer wall spaced from the inner wall, the frame surrounding the inner wall and the outer wall, and the frame, the inner wall and the outer wall being an integral structure.

Each second combustion chamber segment may comprise a rigid frame, the rigid frame has a first hook at a first circumferential end of the second combustion chamber segment and a second hook at a second circumferential end of the second combustion chamber segment, the first hook extends circumferentially away from the second combustion chamber segment, the second hook forms a slot with the frame, step b) comprises positioning the first hook of each second combustion chamber segment into the slot of a circumferentially adjacent second combustion chamber segment.

Step b) may comprise moving the second combustion chamber segments axially and/or circumferentially such that the first hook of each second combustion chamber segment locates into the slot of a circumferentially adjacent second combustion chamber segment.

Each second combustion chamber segment may comprise an inner wall and an outer wall spaced from the inner wall, the frame surrounding the inner wall and the outer wall, and the frame, the inner wall and the outer wall being an integral structure.

The frame of each first combustion chamber segment may have a circumferentially extending slot at a first axial end of the frame and the first ring has an annular axially extending projection, step a) comprises positioning the slot of each first combustion chamber segment on the annular axially extending projection of the first ring.

The frame of each second combustion chamber segment may have a circumferentially extending slot at a first axial end of the frame and the second ring has an annular axially extending projection, step b) comprises positioning the slot of each second combustion chamber segment on the annular axially extending projection of the second ring.

The method may comprise a further step of removably securing an annular cowl to the upstream end wall.

Step a) may be performed before step b) or step b) may be performed before step a).

According to a second aspect of the present disclosure there is provided a method of assembling an annular combustion chamber assembly, the annular combustion chamber comprising an annular upstream end wall, a radially outer annular wall, a radially inner annular wall, a first ring and a second ring, the first ring having a greater diameter than the second ring, the radially outer annular wall comprising a plurality of first combustion chamber segments and the radially inner annular wall comprising a plurality of second combustion chamber segments, the method comprising the steps of:

a) positioning the first combustion chamber segments circumferentially side by side to form an annulus, removably securing the downstream end of each first combustion chamber segment to the first ring to form a first assembly and positioning the second combustion chamber segments circumferentially side by side to form an annulus, removably securing the downstream end of each second combustion chamber segment to the second ring and removably securing the upstream end of each second combustion chamber segment to the upstream end wall to form a second assembly or positioning the first combustion chamber segments circumferentially side by side to form an annulus, removably securing the downstream end of each first combustion chamber segment to the first ring and removably securing the upstream end of each first combustion chamber segment to the upstream end wall to form a first assembly and positioning the second combustion chamber segments circumferentially side by side to form an annulus, removably securing the downstream end of each second combustion chamber segment to the second ring to form a second assembly, b) inserting the second assembly into the first assembly, and c) removably securing the upstream end of each first combustion chamber segment of the first assembly to the annular upstream end wall to form the annular combustion chamber assembly or removably securing the upstream end of each second combustion chamber segment of the second assembly to the annular upstream end wall to form the annular combustion chamber assembly.

According to a third aspect of the present disclosure there is provided a method of assembling an annular combustion chamber assembly, the annular combustion chamber comprising an annular upstream end wall, a radially outer annular wall, a radially inner annular wall, a first ring and a second ring, the first ring having a greater diameter than the second ring, the radially outer annular wall comprising a plurality of first combustion chamber segments and the radially inner annular wall comprising a plurality of second combustion chamber segments, the method comprising the steps of:

a) positioning the first combustion chamber segments circumferentially side by side to form an annulus and removably securing the downstream end of each first combustion chamber segment to the first ring to form a first assembly, b) positioning the second combustion chamber segments circumferentially side by side to form an annulus, removably securing the downstream end of each second combustion chamber segment to the second ring to form a second assembly, c) removably securing the upstream end of each second combustion chamber segment of the second assembly to the annular upstream end wall or removably securing the upstream end of each first combustion chamber segment of the first assembly to the annular upstream end wall, d) inserting the second assembly into the first assembly, and e) removably securing the upstream end of each first combustion chamber segment of the first assembly to the annular upstream end wall to form the annular combustion chamber assembly or removably securing the upstream end of each second combustion chamber segment of the second assembly to the annular upstream end wall to form the annular combustion chamber assembly.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which:

FIG. 15 shows a first step in a method of assembling an annular combustion chamber according to the present disclosure.

FIG. 17 shows a second step in a method of assembling an annular combustion chamber according to the present disclosure.

FIG. 18 shows a third step in a method of assembling an annular combustion chamber according to the present disclosure.

FIG. 19 shows a fourth step in a method of assembling an annular combustion chamber according to the present disclosure.

Figure 1:
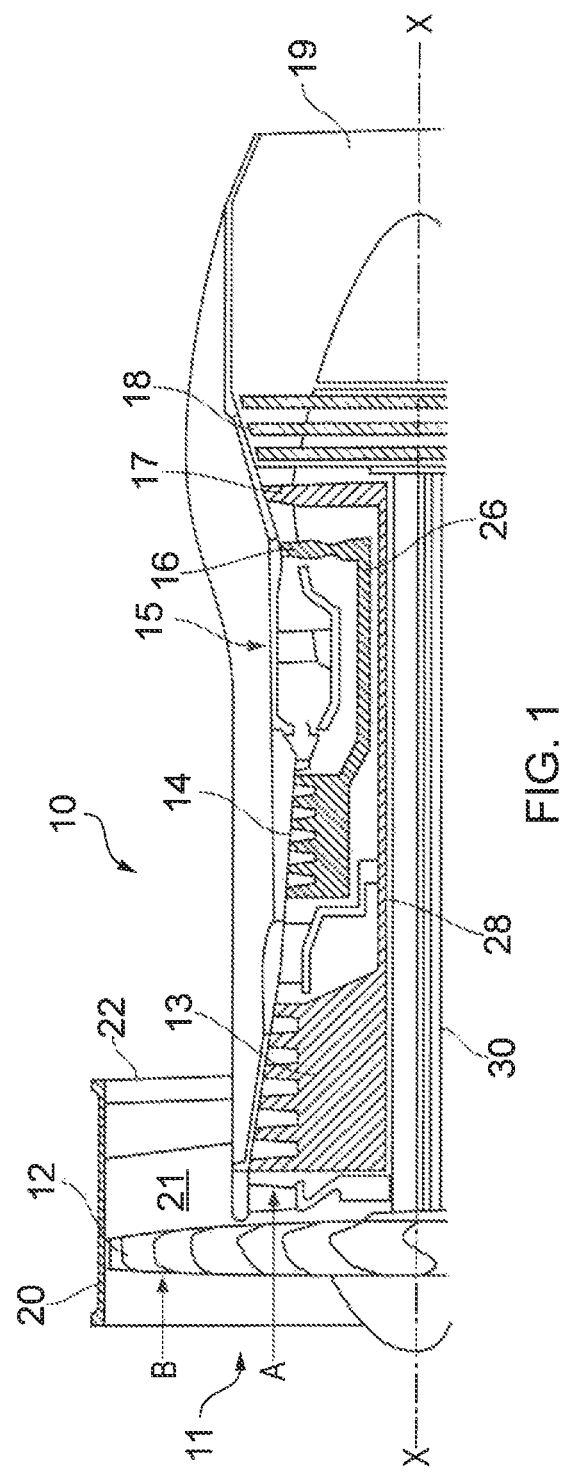
FIG. 1 is partially cut away view of a turbofan gas turbine engine having a combustion chamber comprising combustion chamber segments according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. The fan 12 is arranged within a fan casing 20 which defines a fan, or bypass, duct 21 and the fan duct 21 has a fan exhaust 22. In operation air flows into the intake 11 and is compressed by the fan 12. A first portion of the air A flows through, and is compressed by, the intermediate pressure compressor 13 and the high pressure compressor 14 and is supplied to the combustion chamber 15. Fuel is Injected into the combustion chamber 15 and is burnt in the air to produce hot exhaust gases which flow through, and drive, the high pressure turbine 16, the intermediate pressure turbine 17 and the low pressure turbine 18. The hot exhaust gases leave the low pressure turbine 18 and flow through the exhaust 19 to provide propulsive thrust. A second portion of the air flow B bypasses the main engine and flows through the fan duct 21 and through the fan exhaust 22 to provide propulsive thrust.

Figure 2:
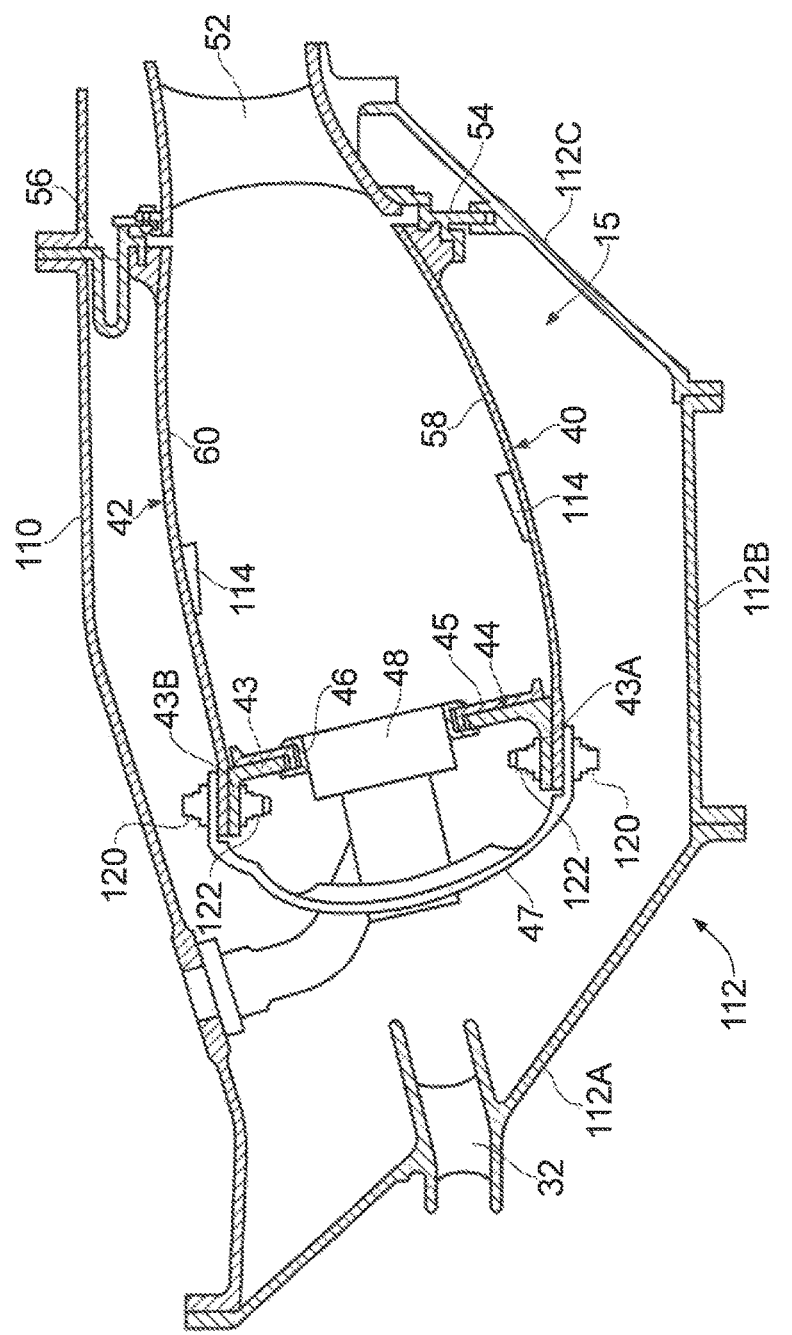
FIG. 2 is an enlarged cross-sectional view of a combustion chamber comprising combustion chamber segments according to the present disclosure.

The combustion chamber 15, as shown more clearly in FIG. 2, is an annular combustion chamber and comprises a radially inner annular wall structure 40, a radially outer annular wall structure 42 and an upstream end wall structure 44. The upstream end of the radially inner annular wall structure 40 is secured to the upstream end wall structure 44 and the upstream end of the radially outer annular wall structure 42 is secured to the upstream end wall structure 44. The upstream end wall structure 44 comprises an upstream end wall 43, a heat shield 45 and a cowl 47. The heat shield 45 is positioned axially downstream of and secured to the upstream end wall 43 to protect the upstream end wall 43 from the combustion gases in the annular combustion chamber 15. The cowl 47 is positioned axially upstream of and secured to the upstream end wall 43. The combustion chamber 15 has a plurality of fuel injectors 48 and the fuel injectors 48 are arranged to supply fuel into the annular combustion chamber 15 during operation of the gas turbine engine 10. The upstream end wall 43 has a plurality of circumferentially spaced apertures 46 and each aperture 46 has a respective one of the plurality of fuel injectors 48 located therein. The heat shield 45 and the cowl 47 also each have a plurality of circumferentially spaced apertures and each aperture in the heat shield 45 and the cowl 47 is aligned with a corresponding aperture 46 in the upstream end wall 43. A plurality of circumferentially arranged compressor outlet guide vanes 32 are positioned axially upstream of the combustion chamber 15 and are arranged to direct the compressed air from the high pressure compressor 14 into the annular combustion chamber 15, A plurality of circumferentially arranged turbine nozzle guide vanes 52 are positioned axially downstream of the combustion chamber 15 and are arranged to direct the hot gases from the annular combustion chamber 15 into the high pressure turbine 16.

The annular combustion chamber 15 is positioned radially between a radially outer combustion chamber casing 110 and a radially inner combustion chamber casing 112. The radially inner combustion chamber casing 112 comprises a first, upstream, portion 112A, a second, intermediate, portion 112B and a third, downstream, portion 112C. The upstream end of the first portion 112A of the radially inner combustion chamber casing 112 is removably secured to the upstream end of the radially outer combustion chamber casing 110. In this example a flange at the upstream end of the first portion 112A of the radially inner combustion chamber casing 112 is removably secured to a flange at the upstream end of the radially outer combustion chamber casing 110 by suitable fasteners, e.g. nuts and bolts, passing through the flanges. The downstream end of the first portion 112A of the radially inner combustion chamber casing 112 is removably secured to the upstream end of the second portion 112B of the radially inner combustion chamber casing 112. In this example a flange at the upstream end of the second portion 112B of the radially inner combustion chamber casing 112 is removably secured to a flange at the downstream end of the first portion 112A of the radially inner combustion chamber casing 112 by suitable fasteners, e.g. nuts and bolts, passing through the flanges. The downstream end of the second portion 112B of the radially inner combustion chamber casing 112 is removably secured to the upstream end of the third portion 112C of the radially inner combustion chamber casing 112 and the downstream end of the third portion 112O of the radially inner combustion chamber casing 112 is removably secured to the radially inner ends of the turbine nozzle guide vanes 52. In this example a flange at the upstream end of the third portion 112C of the radially inner combustion chamber casing 112 is removably secured to a flange at the downstream end of the second portion 112B of the radially inner combustion chamber casing 112 by nuts and bolts passing through the flanges and flanges on the turbine nozzle guide vanes 52 are removably secured to a flange at the downstream end of the third portion 112C of the radially inner combustion chamber casing 112 by nuts and bolts passing through the flanges.

The first portion 112A of the radially inner combustion chamber casing 112 is generally frustoconical and extends radially inwardly and axially downstream from its upstream end to the radially outer ends of the compressor outlet guide vanes 32 and extends radially inwardly and axially downstream from the radially inner ends of the compressor outlet guide vanes 32 to its downstream end. The second portion 112B of the radially inner combustion chamber casing 112 is generally cylindrical. The third portion 112O of the radially inner combustion casing 112 is generally frustoconical and extends radially outwardly and axially downstream from its upstream end to the radially inner ends of the turbine nozzle guide vanes 52.

The upstream end wall 43 has an inner annular flange 43A extending in an axially upstream direction therefrom and an outer annular flange 43B extending in an axially upstream direction therefrom. The upstream end wall 43 forms a radially inner upstream ring structure and a radially outer upstream ring structure. A radially inner downstream ring structure 54 is mounted off the radially inner combustion chamber casing 112 and a radially outer downstream ring structure 56 is mounted off the radially outer combustion chamber casing 110. The radially inner annular wall structure 40 of the annular combustion chamber 15 and the radially outer annular wall structure 42 of the annular combustion chamber 15 comprise a plurality of circumferentially arranged combustion chamber segments 58 and 60 respectively. It is to be noted that the combustion chamber segments 58, 60 extend the full axial, longitudinal, length of the annular combustion chamber 15.

Figure 3:
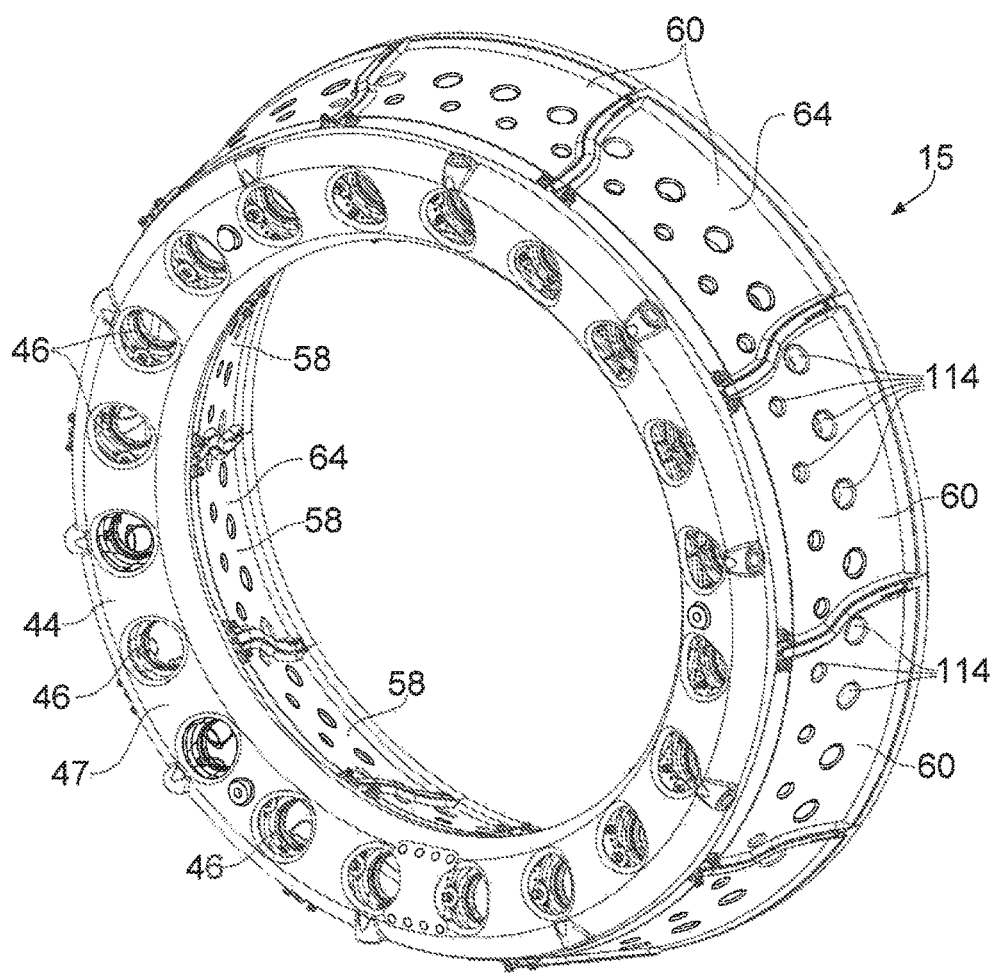
FIG. 3 is a perspective view of a combustion chamber comprising combustion chamber segments according to the present disclosure.

The circumferential arrangement of combustion chamber segments 58 and 60 of the radially inner and radially outer annular wall structures 40 and 42 of the annular combustion chamber 15 are clearly shown in FIG. 3. In this example there are ten combustion chamber segments 58 and ten combustion chamber segments 60 and each combustion chamber segment 58 and 60 extends through an angle of 36°. Other suitable numbers of combustion chamber segments 58 and 60 may be used, e.g. two, three, four, five, six, eight or twelve, and the number of combustion chamber segments 58 may be the same as or different to the number of combustion chamber segments 60. It is preferred that each of the combustion chamber segments extends through the same angle, but it may be possible to arrange the combustion chamber segments to extend through different angles.

Figure 4:
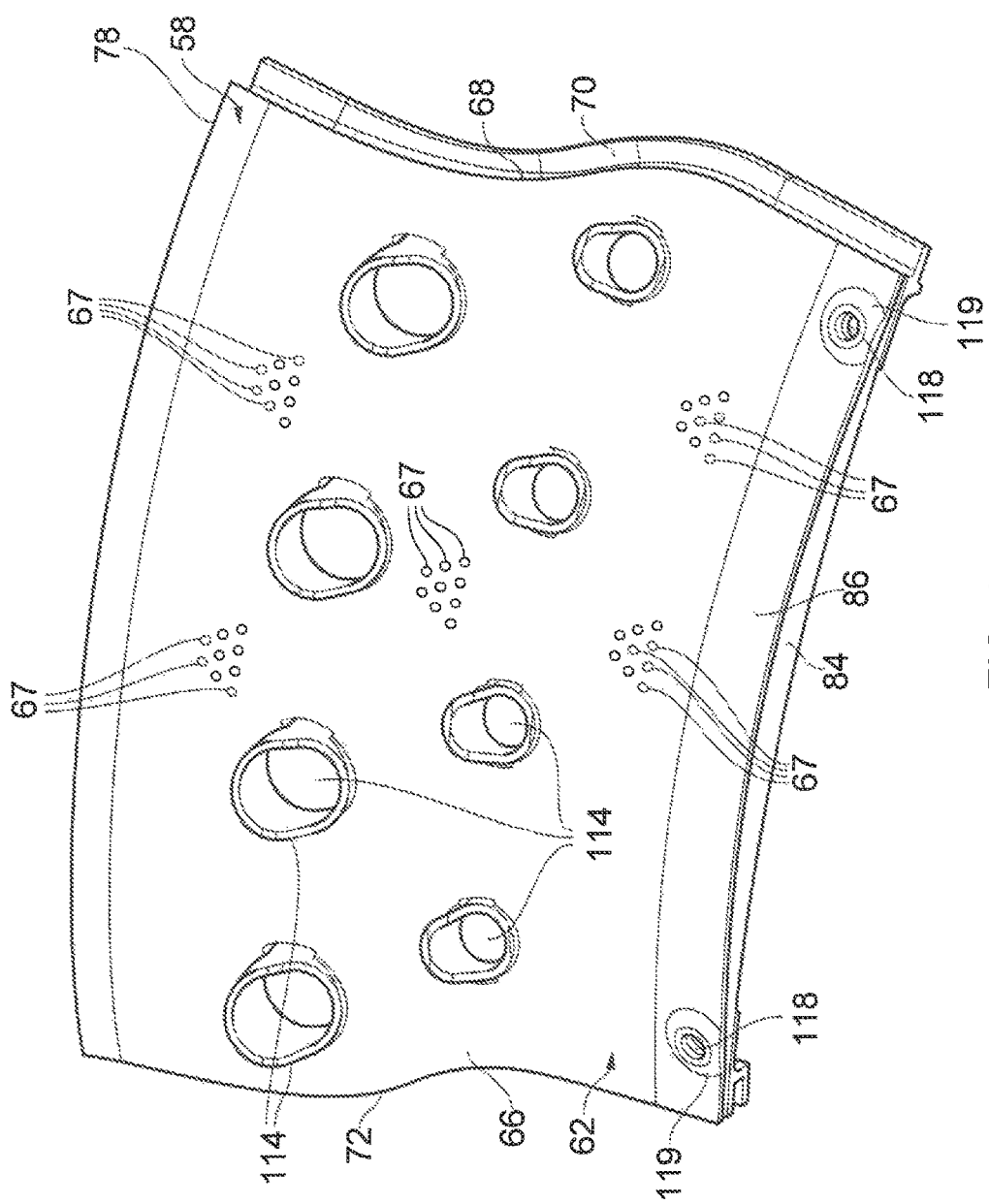
FIG. 4 is a further enlarged perspective view of a hot side of a combustion chamber segment shown in FIG. 3.
Figure 5:
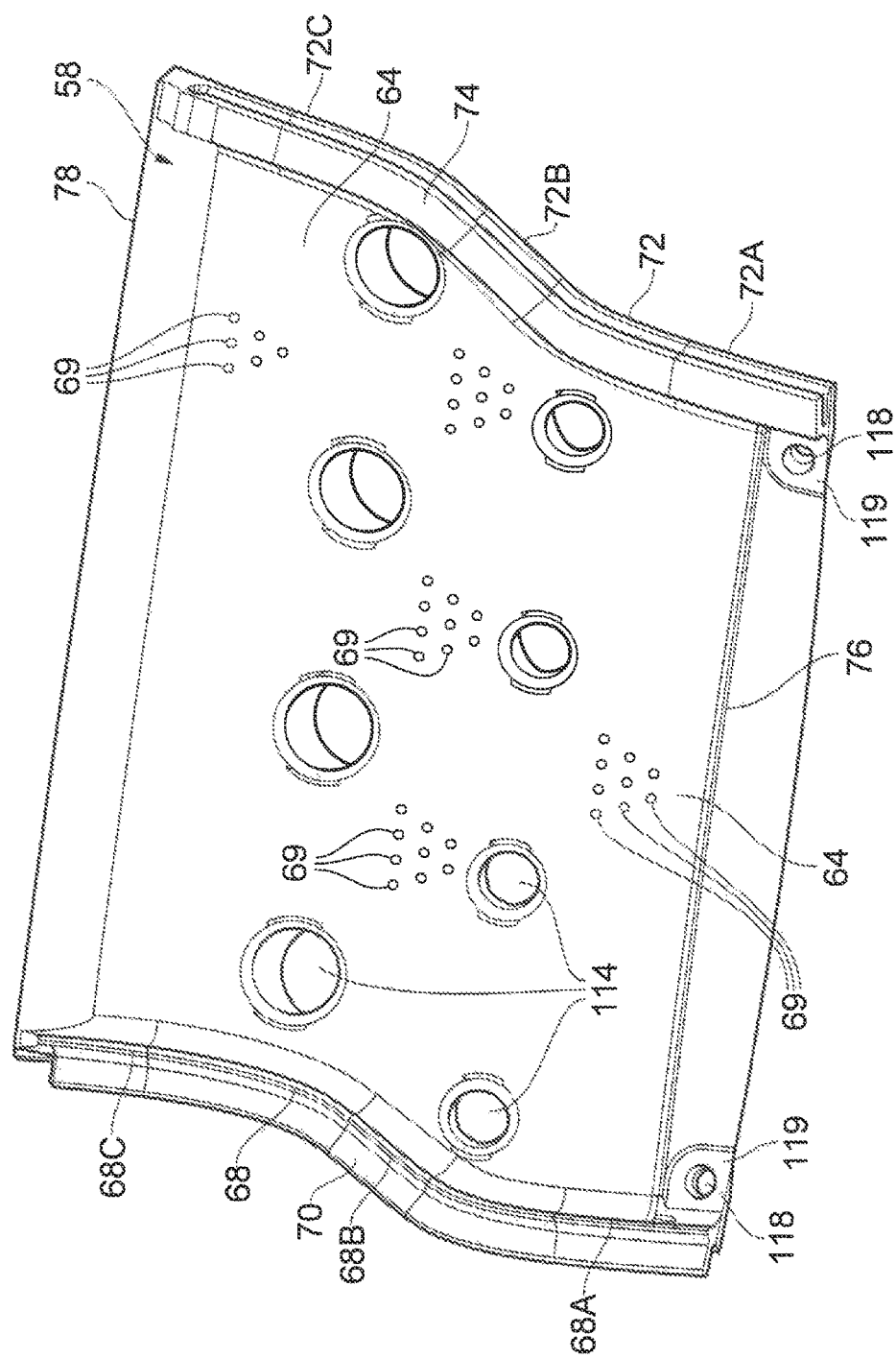
FIG. 5 is a further enlarged perspective view of a cold side of a combustion chamber segment shown in FIG. 3.
Figure 6:
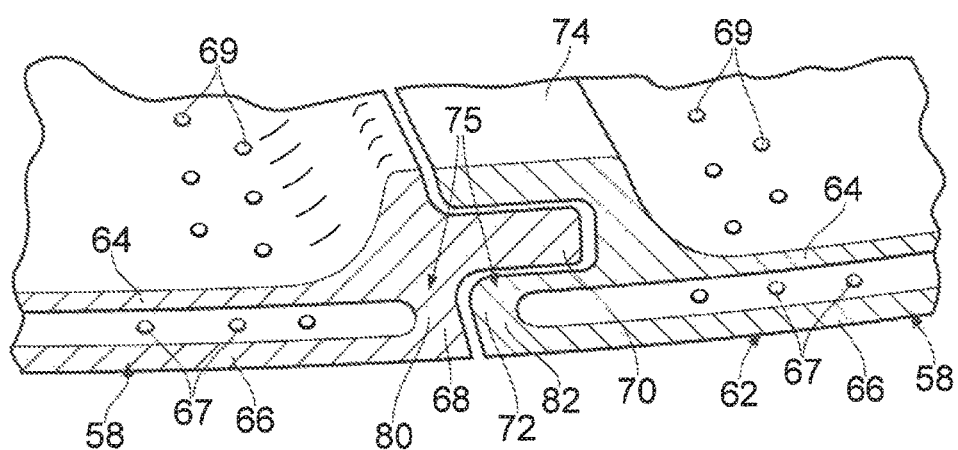
FIG. 6 is a further enlarged cross-sectional view through the portions of the edges of two adjacent combustion chamber segments shown in FIG. 3.

Each combustion chamber segment 58 and 60, as shown in FIGS. 4, 5 and 6, comprises a box like structure 62 including an outer wall 64 and an inner wall 66 spaced from the outer wall 64. The outer wall 64 and the inner wall 66 are arcuate. FIGS. 4, 5 and 6 show a combustion chamber segment 58 of the radially inner annular wall structure 40 and a combustion chamber segment 60 of the radially outer annular wall structure 42 are substantially the same as those of the radially inner annular wall structure 40. The outer wall 64 has a plurality of apertures 69 for the supply of coolant into the box like structure 62 and the inner wall 66 has a plurality of apertures 67 for the supply of coolant out of the box like structure 62. A first edge 68 of the box like structure 62 has a first hook 70 extending from the outer wall 64 and away from the inner wall 66. The first hook 70 extends at least a portion of the axial, longitudinal, length of the box like structure 62 and the first hook 70 is arranged at a first radial distance from the outer wall 64. A second edge 72 of the box like structure 62 has a second hook 74 extending from the outer wall 64 and away from the inner wall 66. The second hook 74 extends at least a portion of the axial, longitudinal, length of the box like structure 62, the second hook 74 is arranged at a second radial distance from the outer wall 64 and the second radial distance is greater than the first radial distance. The first hook 70 of each combustion chamber segment 58, 60 engages the outer wall 64 at the second edge 72 of an adjacent combustion chamber segment 58, 60 and the second hook 74 of each combustion chamber segment 58, 60 engages the first hook 70 of an adjacent combustion chamber segment 58, 60 to form a seal and to distribute loads between the adjacent combustion chamber segments 58, 60 and to maintain a circular profile, shape, for the radially inner, or radially outer, annular wall structure 40 and 42 of the annular combustion chamber 15, e.g. to prevent dislocation of the combustion chamber segments 56, 60. Thus, the first hook 70 of each combustion chamber segment 58, 60 contacts, abuts, or is in close proximity to the surface of the outer wall 64 at the second edge 72 of the adjacent combustion chamber segment 58, 60 and the second hook 74 of each combustion chamber segment 56, 60 contacts, abuts, or is in close proximity to the surface of the first hook 70 at the first edge 68 of the adjacent combustion chamber segment 58, 60. The first hook 70 of each combustion chamber segment 60 is arranged radially outwardly of the outer wall 64 at the second edge 72 of the adjacent combustion chamber segment 60 and the second hook 74 of each combustion chamber 60 is arranged radially outwardly of the first hook 70 at the first edge 68 of the adjacent combustion chamber segment 60. Similarly, the first hook 70 of each combustion chamber segment 58 is arranged radially inwardly of the outer wall 64 at the second edge 72 of the adjacent combustion chamber segment 58 and the second hook 74 of each combustion chamber 58 is arranged radially inwardly of the first hook 70 at the first edge 68 of the adjacent combustion chamber segment 58.

The upstream end of each combustion chamber segment 58, 60 is secured, e.g. removably secured, to the upstream ring structure 43 and the downstream end of each combustion chamber segment 58, 60 is secured, e.g. removably secured, to the downstream ring structure 54, 56. Thus, the upstream end of each combustion chamber segment 58 is secured to the upstream ring structure, e.g. the upstream end wall, 43 and the downstream end of each combustion chamber segment 58 is secured to the radially inner downstream ring structure 54. Similarly, the upstream end of each combustion chamber segment 60 is secured to the upstream ring structure, e.g. the upstream end wall, 43 and the downstream end of each combustion chamber segment 60 is secured to the radially outer downstream ring structure 56.

The first hook 70 extends the length of the box like structure 62 between a securing arrangement and a mounting arrangement and the second hook 74 also extends the length of the box like structure 62 between the securing arrangement and the mounting arrangement. The securing arrangement and the mounting arrangement are discussed further below.

However, it may be possible for the first hook to extend the full length of the box like structure and for the second hook to extend the full length of the box like structure. The size of the first hook and second hook may be the same along the full length of the box like structure, but the size of the first hook and second hook may vary along the length of the box like structure to match local requirements. The size of the first hook and second hook refers to the circumferential length. Alternatively, it may be possible for the first hook to extend only a part of the full length of the box like structure and for the second hook to extend only a part of the full length of the box like structure corresponding to the part of the full length of the first hook so that it inter-engages with a first hook of an adjacent box like structure. Additionally, it may be possible for there to be a plurality of first hooks arranged along the length of the box like structure and for there to be a corresponding number of second hooks arranged along the length of the box like structure so that each second hook inter-engages with a first hook of an adjacent box like structure.

The box like structure 62 of each combustion chamber segment 58, 60 has a first end wall 76 extending from a first, upstream, end of the outer wall 64 to a first, upstream, end of the inner wall 66, a second end wall 78 extending from a second, downstream and opposite, end of the outer wall 64 to a second, downstream and opposite, end of the inner wall 66. A first edge wall 80 extending from a first circumferential edge of the outer wall 64 to a first circumferential edge of the inner wall 66, a second edge wall 82 extending from a second, opposite circumferential, edge of the outer wall 64 to a second, opposite circumferential, edge of the inner wall 66 to form the box like structure 62.

The box like structure 62 of each combustion chamber segment 58, 60 comprises a frame 75. The frame 75 comprises the first and second end walls 76 and 78 and the first and second edge walls 80 and 82. The first and second end walls 76 and 78 and the first and second edge walls 80 and 82 are integral, e.g. one piece. The frame 75 of each combustion chamber segment 58, 60 is radially thicker, and stiffer, than the outer wall 64 and the inner wall 66 and the first and second end walls 76 and 78 and the first and second edge walls 80 and 82 are thicker axially and thicker circumferentially respectively than the radial thickness of the outer and inner walls 64 and 66 in order to carry loads and interface with adjacent combustion chamber segments 58, 60 and the upstream ring structure and the downstream ring structure. The frame 75 of each combustion chamber segment 58, 60 is arranged to carry the structural loads, the thermal loads, surge loads, g-force loads and flameout loads.

The first hook 70 is provided on the first edge wall 80 and the second hook 74 is provided on the second edge wall 82. In other words the box like structure 62 of each combustion chamber segment 58, 60 comprises the frame 75 and portions of the outer and inner walls 64 and 66 extending axially, longitudinally, between the first and second end walls 76 and 78 and extending circumferentially, laterally, between the first and second edge walls 80 and 82. The outer wall 64 and the inner wall 66 are also integral with the frame 75, e.g. the outer wall 64, the inner wall 66 and the frame 75 are a single piece, a monolithic piece. The thickness of the inner wall 66 and/or the outer wall 64 may be varied longitudinally, axially, and circumferentially to control the stiffness of the stiffness of the inner wall 66 and/or the outer wall 64 to minimise stresses and strains and to provide gradual change in stiffness from the frame 75 to the inner wall 66 and/or outer wall 64. The inner wall 66 and/or the outer wall 64 are thicker adjacent to the frame 75 and decrease in thickness away from the frame 75.

Each combustion chamber segment comprises an integral structure, e.g. a single piece or monolithic piece, formed by additive layer manufacturing. The apertures in the outer wall, the apertures in the inner wall and any structure or structures, e.g. cellular structure or pedestals, between the inner and outer wall are all formed by the additive layer manufacturing (ALM) process. The additive layer manufacturing process may be direct laser deposition (DLD), selective laser sintering, direct electron beam deposition, laser powder bed etc. The combustion chamber segments are built using the additive layer manufacturing by initially starting from the upstream end, or the downstream end, of the combustion chamber segment. The combustion chamber segment is built up layer by layer using additive layer manufacturing in the longitudinal, axial, direction of the wall which corresponds to the direction of flow of hot gases over the second surface of the wall. However, the combustion chamber segment may be built up in other suitable directions, e.g. radial or circumferential direction of the wall.

Thus, the combustion chamber comprises an upstream ring structure, a downstream ring structure and a plurality of circumferentially arranged combustion chamber segments. Each combustion chamber segment extends the full axial, longitudinal, length of the combustion chamber.

Figure 7:
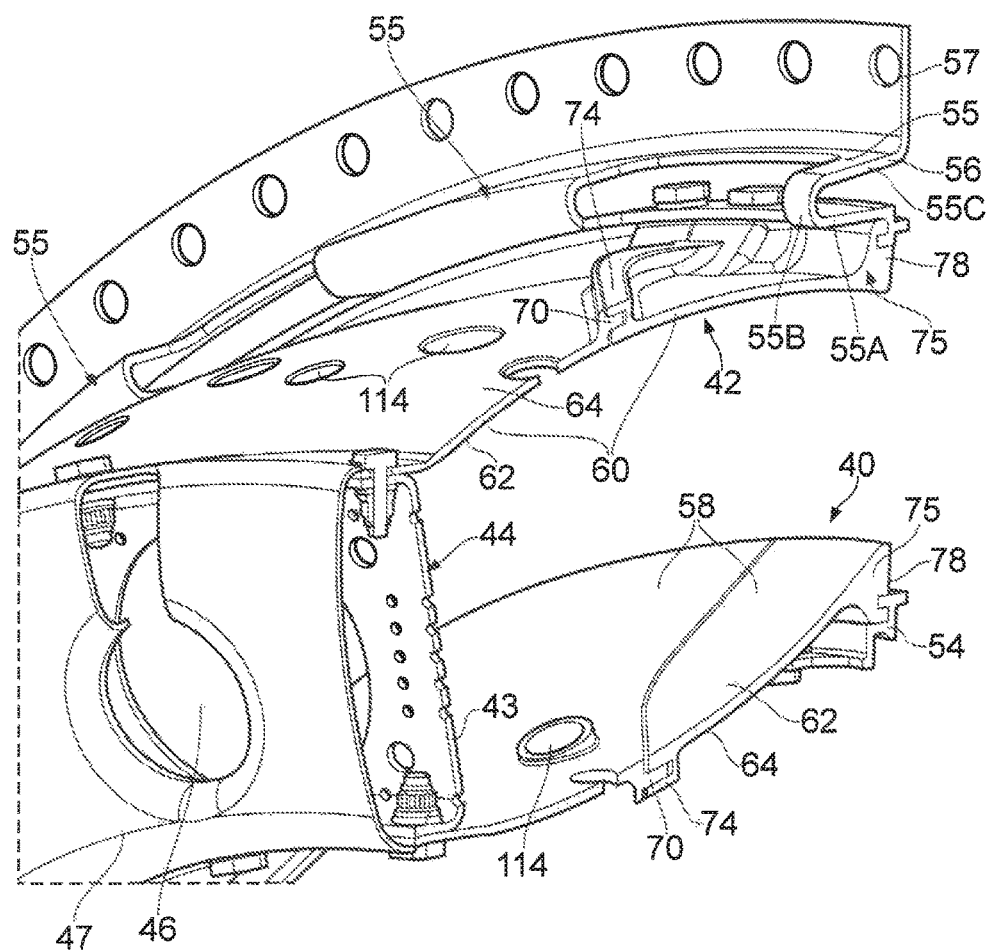
FIG. 7 is a further enlarged partially cut-away view perspective view showing the downstream end of the combustion chamber shown in FIG. 2.
Figure 8:
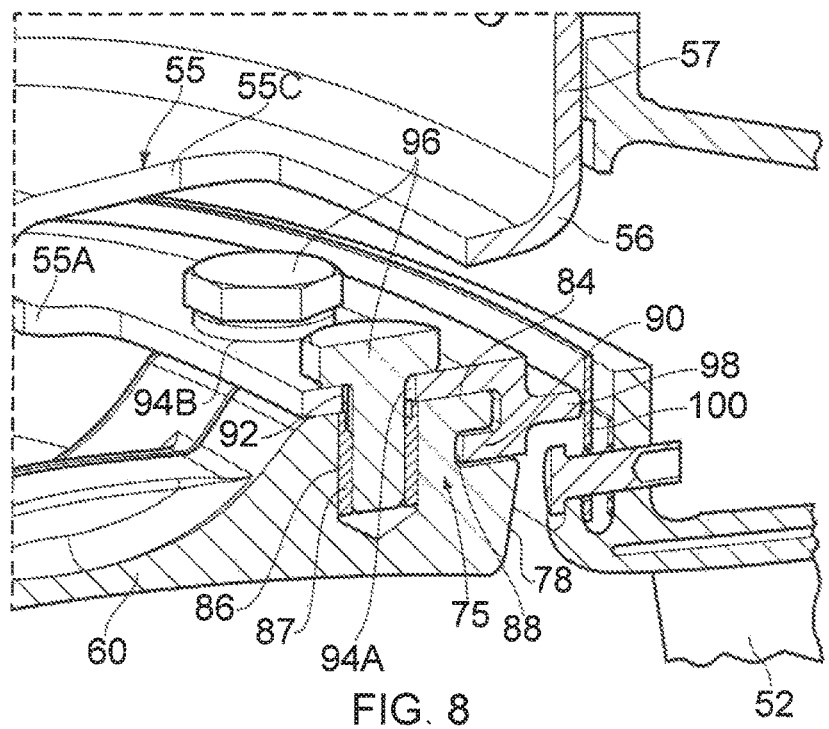
FIG. 8 is a further enlarged perspective view of the downstream end of the radially outer wall of the combustion chamber shown in FIG. 7.
Figure 9:
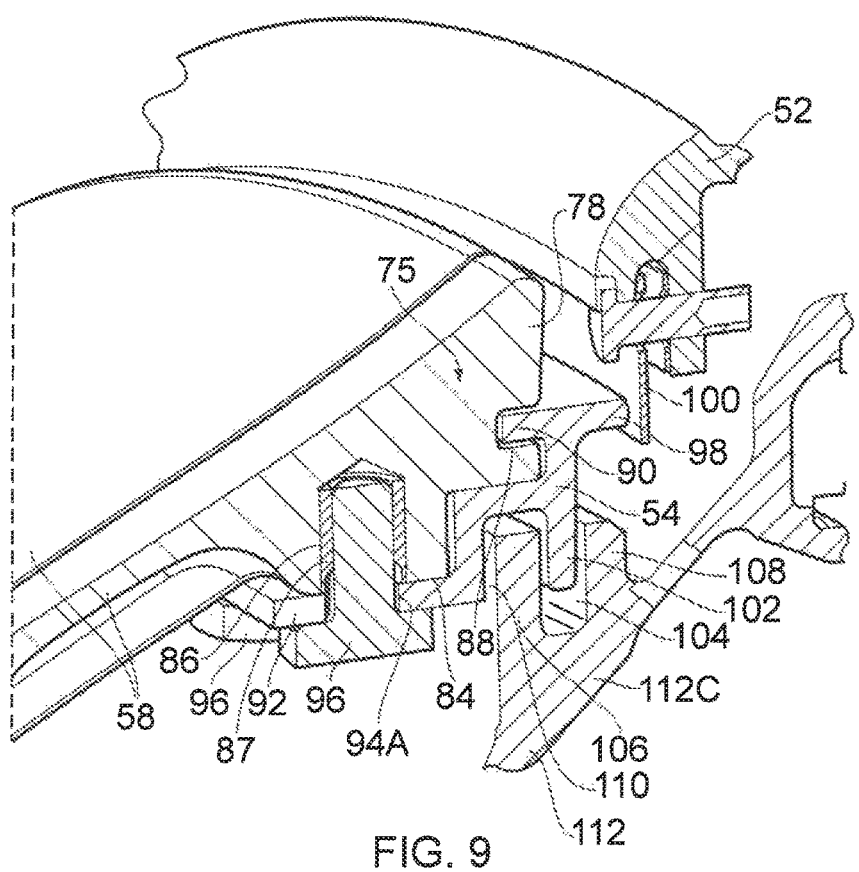
FIG. 9 is a further enlarged perspective view of the downstream end of the radially inner wall of the combustion chamber shown in FIG. 7.

FIGS. 7, 8 and 9 show the radially inner and radially outer downstream ring structures 54 and 56 and the downstream end walls 78 of the corresponding combustion chamber segments 58 and 60 in more detail. The frame structure 75 at the downstream end of each combustion chamber segment 58, 60 comprises a surface 84 having a plurality of circumferentially spaced radially extending bolt holes 86. The downstream edge of the frame structure 75 at the downstream end of each combustion chamber segment 58, 60 has a circumferentially and axially upstream extending groove 88, e.g. each combustion chamber segment 58, 60 has a circumferentially and axially upstream extending groove 88 provided in the downstream end wall 78. The corresponding downstream ring structure 54, 56 has an annular axially upstream extending hook 90 arranged to locate in the axially upstream extending groove 88 of each combustion chamber segment 58, 60 and the downstream ring structure 64, 56 has a portion 92 abutting the surface 84 of the frame structure 75 at the downstream end of each combustion chamber segment 58, 60. The downstream ring structure 54, 56 has a plurality of circumferentially spaced bolt holes 94 extending radially through the portion 92 abutting the surface 84 of the frame structure 75 of the combustion chamber segments 58 and 60.

Each combustion chamber segment 58, 60 is removably secured to the corresponding downstream ring structure 54, 56 by a plurality of bolts 96 locatable in the bolt holes 86 in the combustion chamber segment 58, 60 and the corresponding bolt holes 94 in the corresponding downstream ring structure 54, 56. The downstream ring structure 54, 56 has an annular axially downstream extending member 98 and the annular axially downstream extending member 98 is arranged to form a seal with a radially extending flapper seal 100. The flapper seal 100 is mounted at one end to the high pressure nozzle guide vanes 52. The flapper seal 100 is a sprung strip of metal, which is arranged to push against the member 98.

FIG. 8 shows the radially outer downstream ring structure 56 in more detail and the radially outer downstream ring structure 56 abuts a radially outer surface 84 of the frame structure 75 of each combustion chamber segment 60. The radially outer downstream ring structure 56 comprises at least one U or V shaped portion 56 and an annular radially extending flange 57, each U or V shaped portion 55 has a radially inner limb 55A extending axially upstream from the portion 92 abutting the radially outer surface 84 of the frame structure 75, a bend 55B and a radially outer limb 55O extending axially downstream to the radially extending flange 57. In this example the radially outer downstream ring structure 56 comprises a plurality of circumferentially spaced U or V shaped portions 55 and each U or V shaped portion 55 has a radially inner limb 55A extending axially upstream from the portion 92 abutting the radially outer surface 84 of the frame structure 75, a bend 55B and a radially outer limb 55C extending axially downstream to the radially extending flange 57. The annular axially downstream extending member 98 is arranged to form a seal with a radially outwardly extending flapper seal 100 and the flapper seal 100 is mounted at its radially inner end to the high pressure nozzle guide vanes 52. The flapper seal 100 is a sprung strip of metal, which is arranged to push against the member 98. In this example there are ten U or V shaped portions 55, but more generally the number of U or V shaped portions 55 is the same as the number of combustion chamber segments 60.

The radially extending flange 57 is removably secured to the radially outer combustion chamber casing 110. The downstream end of the radially outer combustion chamber casing 110 is also removably secured to an upstream end of a turbine casing. In this example the radially extending flange 57 is removably secured to a flange at the downstream end of the radially outer combustion chamber casing 110 and a flange at the upstream end of the turbine casing by suitable fasteners, e.g. nuts and bolts.

The frame structure 75 comprises a plurality of bosses and each boss has a corresponding one of the bolt holes 86. In this example there are two bosses and two bolt holes 86 and the bosses are provided at the corners of the frame structure 75 at the downstream end of the combustion chamber segments 60. The bosses and the bolt holes 86 are arranged adjacent the downstream ends of the first and second edge walls 80 and 82.

The radially outer downstream ring structure 56 has a plurality of first bolt holes 94A and a plurality of second bolt holes 94B. The first and second bolt holes 94A and 94B are arranged circumferentially alternately around the radially outer downstream ring structure 56. Each first bolt hole 94A has substantially the same diameter as the diameter of the bolt holes 86 in the frame structure 75 of the combustion chamber segments 60, but each second bolt hole 94B is circumferentially slotted. Each first bolt hole 94A is aligned axially and circumferentially with a bolt hole 86 in a corresponding combustion chamber segment 60 to circumferentially position the combustion chamber segment 60 relative to the radially outer downstream ring structure 56 and each second bolt hole 94B is aligned axially with another bolt hole 86 in the corresponding combustion chamber segment 60 to allow relative circumferential thermal expansion between the combustion chamber segment 60 and the radially outer downstream ring structure 56. A washer may be used with each bolt 96 located in a second bolt hole 94B. The bolt holes 86 may be threaded or may be provided with threaded inserts 87.

Thus, in one particular arrangement each first bolt hole 94A is aligned with the bolt hole 86 in the boss adjacent the downstream end of the first edge wall 80 of a corresponding one of the combustion chamber segments 60 and each second bolt hole 94B is aligned with the bolt hole 86 in the boss adjacent the downstream end of the second edge wall 82 of a corresponding one of the combustion chamber segments 60.

The bolt holes 94 in the portion 92 of the radially outer downstream ring structure 56 are positioned circumferentially between adjacent U or V shaped portions 55 of the radially outer downstream ring structure 56. Additionally, the bolt holes 86 at the corners of the frames 75 of the combustion chamber segments 60 and the bolts 96 are also positioned circumferentially between adjacent U or V shaped portions 55 of the radially outer downstream ring structure 56. Thus, the edges of the combustion chamber segments at the downstream end of the combustion chamber segments 60 are positioned circumferentially between the U or V shaped portions 55 of the radially outer downstream ring structure 56.

Thus, it is to be noted that the radially outer downstream ring structure 56 is located radially around the downstream ends of the combustion chamber segments 60 and the radially outer downstream ring structure 56 abuts the radially outer surface 84 of the frame structure 75 of each combustion chamber segment 60. In addition the annular hook 90 on the radially outer downstream ring structure 56 locates in the grooves 88 at the downstream ends of the combustion chamber segments 60. These features provide radial restraint against radial outward movement of the combustion chamber segments 60.

FIG. 9 shows the radially inner downstream ring structure 54 in more detail and the radially inner downstream ring structure 54 abuts a radially inner surface 84 of the frame structure 75 of each combustion chamber segment 58. The radially inner downstream ring structure 54 comprises an annular radially inwardly extending flange 102. The radially inwardly extending flange 102 is removably located in a radially extending groove 104 on the radially inner combustion chamber casing 112. The annular radially extending groove 104 is defined between two annular radially outwardly extending flanges 106 and 108 on the radially inner combustion chamber casing 112. For example the radially extending groove 104 and the annular radially outwardly extending flanges 106 and 108 are provided on the downstream portion 1120 of the radially inner combustion chamber casing 112. The radially outwardly extending flange 106 is arranged to locate in an annular radially outwardly extending groove 110 on the radially inner downstream ring structure 54.

The frame structure 75 comprises a plurality of bosses and each boss has a corresponding one of the bolt holes 86. In this example there are two bosses and two bolt holes 86 and the bosses are provided at the corners of the frame structure 75 at the downstream end of the combustion chamber segments 58. The bosses and the bolt holes 86 are arranged adjacent the downstream ends of the first and second edge walls 80 and 82.

The radially inner downstream ring structure 54 has a plurality of first bolt holes 94A and a plurality of second bolt holes 94B. The first and second bolt holes 94A and 94B are arranged circumferentially alternately around the radially inner downstream ring structure 54. Each first bolt hole 94A has substantially the same diameter as the diameter of the bolt holes 86 in the frame structure 75 of the combustion chamber segments 58, but each second bolt hole 94B is circumferentially slotted. Each first bolt hole 94A is aligned axially and circumferentially with a bolt hole 86 in a corresponding combustion chamber segment 58 to circumferentially position the combustion chamber segment 58 relative to the radially inner downstream ring structure 54 and each second bolt hole 94B is aligned axially with another bolt hole 86 in the corresponding combustion chamber segment 58 to allow relative circumferential thermal expansion between the combustion chamber segment 58 and the radially inner downstream ring structure 54. A washer may be used with each bolt 96 located in a second bolt hole 94B. The bolt holes 86 may be threaded or may be provided with threaded inserts 87.

Thus, in one particular arrangement each first bolt hole 94A is aligned with the bolt hole 86 in the boss adjacent to the downstream end of the first edge wall 80 of a corresponding one of the combustion chamber segments 58 and each second bolt hole 94B is aligned with the bolt hole 86 in the boss adjacent to the downstream end of the second edge wall 82 of a corresponding one of the combustion chamber segments 58.

Thus, it is to be noted that the radially inner downstream ring structure 54 is located radially within the downstream ends of the combustion chamber segments 58 and the radially inner downstream ring structure 54 abuts the radially outer surface 84 of the frame structure 75 of each combustion chamber segment 58. In addition the annular hook 90 on the radially inner downstream ring structure 54 locates in the grooves 88 at the downstream ends of the combustion chamber segments 58. These features provide radial restraint against radial inward movement of the combustion chamber segments 60.

The radially inner and radially outer downstream ring structures 54 and 56 may be manufactured by forging a ring and then machining, for example turning, the forged ring.

The surfaces 84 of the frame 75 of the combustion chamber segments 58 and 60 and the portions 92 of the corresponding downstream ring structures 54 and 56 are arranged parallel to the axis of the annular combustion chamber 15. The grooves 88 in the frames 75 of the combustion chamber segments 58 and the hooks 90 of the corresponding downstream ring structures 54 and 56 are arranged parallel to the axis of the annular combustion chamber 15.

The combustion chamber segments 58 and 60 have dilution apertures 114 to supply air for mixing into the annular combustion chamber 15. However, if the annular combustion chamber 15 is a lean burn combustion chamber, the combustion chamber segments 58 and 60 do not require dilution apertures.

Figure 10:
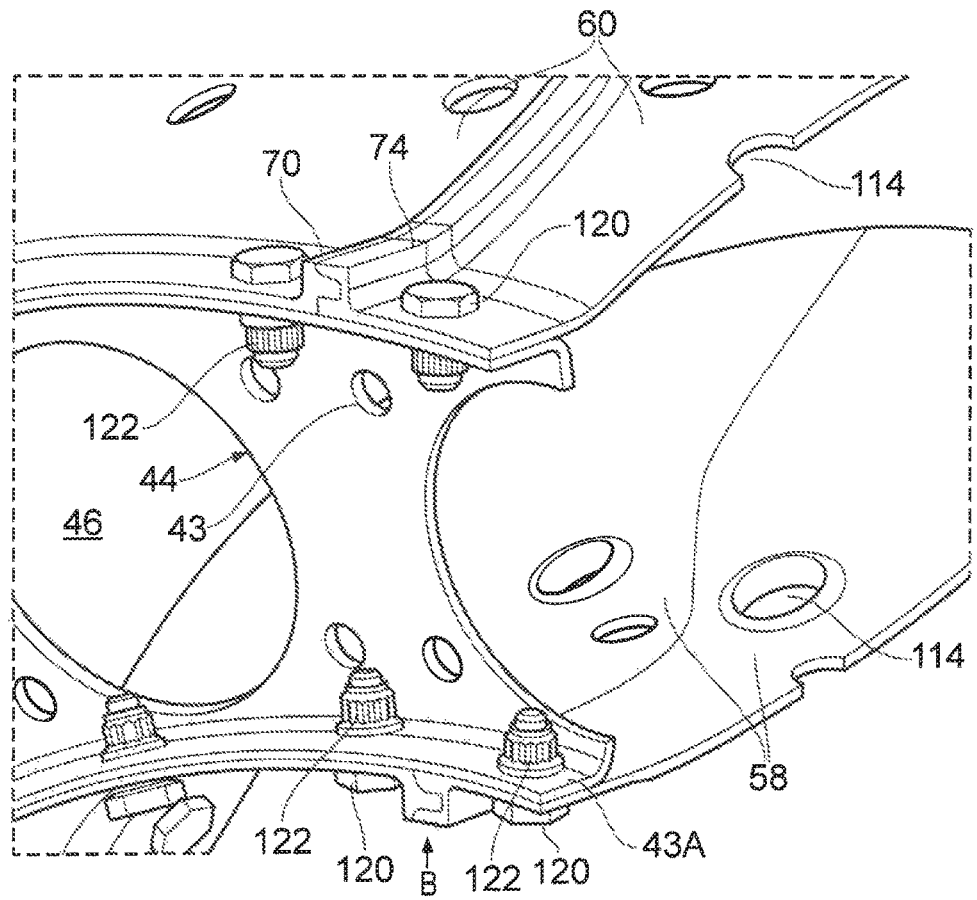
FIG. 10 is a further enlarged cut-away perspective view of the upstream ends of the radially inner and radially outer walls and the upstream end wall of the combustion chamber shown in FIG. 7.
Figure 11:
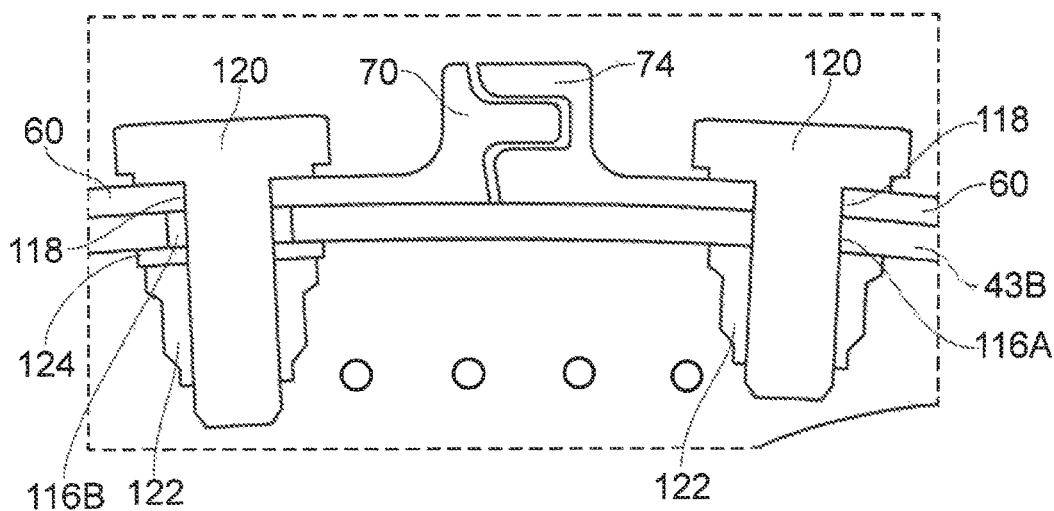
FIG. 11 is a further enlarged cross-sectional view through the portions of the edges of two adjacent combustion chamber segments of the radially outer wall in a plane perpendicular to the axis of the combustion chamber shown in FIG. 10.

FIGS. 10 and 11 show the upstream end wall 43 and the upstream ends of the combustion chamber segments 58 and 60. As mentioned previously the upstream end of each combustion chamber segment 58, 60 is secured, e.g. removably secured, to the upstream ring structure 43. Thus, the upstream end of each combustion chamber segment 58 is secured to the upstream ring structure, e.g. to the inner annular flange 43A extending in an axially upstream direction from the upstream end wall 43 and the upstream end of each combustion chamber segment 60 is secured to the upstream ring structure, e.g. to the outer annular flange 43B extending in an axially upstream direction from the upstream end wall 43. The upstream end of each combustion chamber segment 58 is positioned radially within and abutting the inner annular flange 43A of the upstream end wall 43 and the upstream end of each combustion chamber segment 60 is positioned radially outside and abutting the outer annular flange 433 of the upstream end wall 43. The inner and outer flanges 43A and 433 are preferably parallel to the axis X-X of the gas turbine engine 10. Each combustion chamber segment 58 has a minimum of two bolt holes.

The upstream end of each combustion chamber segment 58 has at least two bolt holes 118 and the two bolt holes 118 are provided at the corners of the combustion chamber segments 58. The bolt holes 118 are arranged adjacent the upstream ends of the first and second edge walls 80 and 82 and adjacent the first and second hooks 70 and 74. Some of the bolt holes 118 are cylindrical and the remainder of the bolt holes 118 are axially slotted to allow for manufacturing tolerances. The bolt holes 118 extend radially through each combustion chamber segment 58.

The inner annular flange 43A has a plurality of first bolt holes 116A and a plurality of second bolt holes 116B. The first and second bolt holes 116A and 1163 extend radially through the inner annular flange 43A. The first and second bolt holes 116A and 1163 are arranged circumferentially alternately around the inner annular flange 43A of the upstream end wall 43, e.g.; the radially inner upstream ring structure. Each first bolt hole 116A is cylindrical and has substantially the same diameter as the diameter of the bolt holes 118 in the upstream end of the combustion chamber segments 58, but each second bolt hole 116B is circumferentially slotted. Each first bolt hole 116A is aligned axially and circumferentially with a bolt hole 118 in a corresponding combustion chamber segment 58 to circumferentially position the combustion chamber segment 68 relative to the radially inner upstream ring structure, the inner annular flange 43A of the upstream end wall 43 and each second bolt hole 116B is aligned axially with another bolt hole 118 in the corresponding combustion chamber segment 58 to allow relative circumferential thermal expansion between the combustion chamber segment 58 and the radially inner upstream ring structure, the inner annular flange 43A of the upstream end wall 43. The bolts 120 are threaded into respective nuts 122. A washer 124 may be used with each bolt 120 located in a second bolt hole 116B. The heads of the bolts 120 abut the upstream ends of the combustion chamber segments 58 and the washers 124 are provided the between the nuts 124 and the inner annular flange 43A. Alternatively, the nuts 122 may abut the upstream ends of the combustion chamber segments 58 and the washers 124 are provided the between the heads of the bolts 120 and the inner annular flange 43A. The bolts 120 extend radially with respect to the axis of the gas turbine engine 10. The bolt holes 118 pass through thickened portions 119 of the upstream ends of the combustion chamber segments 58 to manage the stresses. Additionally, or alternatively, the bolt holes 116A, 116B pass through thickened portions of the inner annular flange 43A to manage the stresses.

Similarly, the upstream end of each combustion chamber segment 60 has at least two bolt holes 118 and the two bolt holes 118 are provided at the corners of the combustion chamber segments 60. The bolt holes 118 are arranged adjacent the upstream ends of the first and second edge walls 80 and 82 and adjacent the first and second hooks 70 and 74. The bolt holes 118 extend radially through each combustion chamber segment 60. All of the bolt holes 118 are axially slotted to allow manufacturing tolerances and adjustment of the axial distance between the radially inner and outer downstream rings 54 and 56 and the fuel injector apertures.

The outer annular flange 43B has a plurality of first bolt holes 116A and a plurality of second bolt holes 116B. The first and second bolt holes 116A and 116B extend radially through the outer annular flange 43B. The first and second bolt holes 116A and 116B are arranged circumferentially alternately around the outer annular flange 43B of the upstream end wall 43, e.g. the radially outer upstream ring structure. Each first bolt hole 116A is cylindrical and has substantially the same diameter as the diameter of the bolt holes 118 in the upstream end of the combustion chamber segments 60, but each second bolt hole 116B is circumferentially slotted. Each first bolt hole 116A is aligned axially and circumferentially with a bolt hole 118 in a corresponding combustion chamber segment 60 to circumferentially position the combustion chamber segment 60 relative to the radially outer upstream ring structure, the outer annular flange 43B of the upstream end wall 43 and each second bolt hole 116B is aligned axially with another bolt hole 118 in the corresponding combustion chamber segment 60 to allow relative circumferential thermal expansion between the combustion chamber segment 60 and the radially outer upstream ring structure, the outer annular flange 43B of the upstream end wall 43. The bolts 120 are threaded into respective nuts 122. A washer 124 may be used with each bolt 120 located in a second bolt hole 116B. The heads of the bolts 120 abut the upstream ends of the combustion chamber segments 60 and the washers 124 are provided between the nuts 124 and the outer annular flange 43B. Alternatively, the nuts 122 may abut the upstream ends of the combustion chamber segments 60 and the washers 124 are provided between the heads of the bolts 120 and the outer annular flange 43B. The bolts 120 extend radially with respect to the axis of the gas turbine engine 10. The bolt holes 118 pass through thickened portions 119 of the upstream ends of the combustion chamber segments 60 to manage the stresses. Additionally, or alternatively, the bolt holes 116A, 116B pass through thickened portions of the outer annular flange 43B to manage the stresses.

Figure 12:
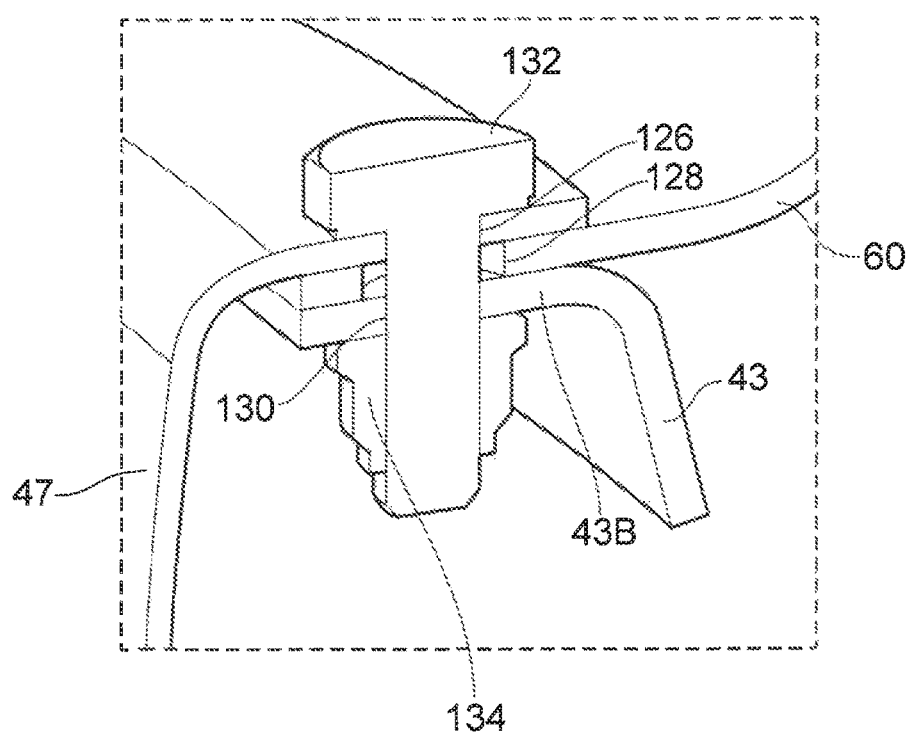
FIG. 12 is a further enlarged cross-sectional view through the upstream end of the combustion chamber in a plane containing the axis of the combustion chamber shown in FIG. 7.
Figure 13:
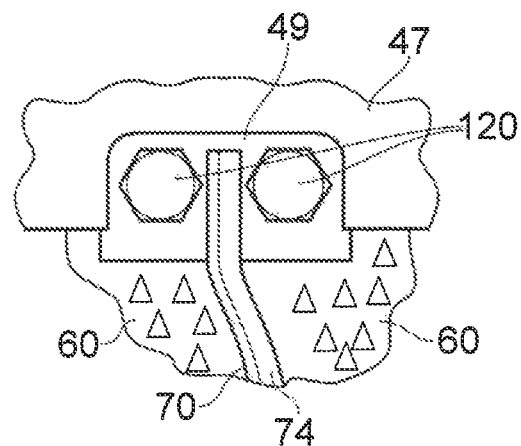
FIG. 13 is view in the direction of arrow B in FIG. 10.
Figure 14:
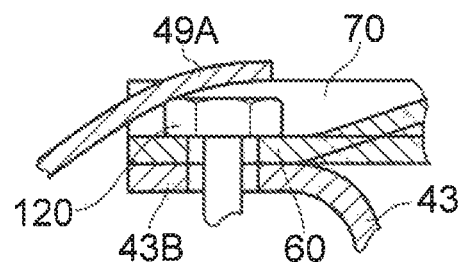
FIG. 14 is a cross-sectional view through the cowl and upstream end wall and a combustion chamber segment.

FIG. 12 shows the fixing of the cowl 47 to the upstream end wall 43 of the combustion chamber 40 using bolts 132 and nuts 134. A number of bolt holes 126 are positioned circumferentially around the cowl 47 with corresponding bolt holes 128 in each of the combustion chamber segments 58, 60 and corresponding bolt holes 130 in the inner annular flange 43A and the outer annular flange 43B. The bolt holes 130 in the inner annular flange 43A and the outer annular flange 43B are cylindrical. The bolt hole 128 in each combustion chamber segment 58, 60 is cylindrical but has a larger diameter than the bolt holes 130. Three bolt holes 126 in the cowl 47 are cylindrical and have the same diameter as the bolt holes 130 and the remaining bolt holes 126 are circumferentially slotted to allow for manufacturing tolerances and to allow relative thermal expansion and contraction. The bolt holes 128 in the combustion chamber segments 58 and 60 are oversized to account for manufacturing tolerances and to allow thermal expansion and contraction of the combustion chamber segments 58 and 60 without imparting loads into the bolts securing the cowl 47 to the upstream end wall 43. It is to be noted that the cowl 47 is provided with a plurality of scallops, or cut-backs, 49 on both its radially outer axially extending flange and its radially inner axially extending flange, as shown in FIG. 13. Each scallop, cut back, 49 is located at an interface between adjacent combustion chamber segments 58 or at an interface between adjacent combustion chamber segments 60. Each scallop 49 comprises a region where the downstream end of the cowl 47 is locally positioned axially upstream of the remainder of the downstream end of the cowl 47. The bolts securing two adjacent combustion chamber segments 58 to the radially inner flange 43A and the hooks 70, 74 of the two adjacent combustion chamber segments 58 are located in a respective one of the scallops 49 and the bolts securing two adjacent combustion chamber segments 60 to the radially outer flange 43B and the hooks 70, 74 of the two adjacent combustion chamber segments 60 are located in a respective one of the scallops 49. Alternatively, the cowl 47 may have a plurality of local flaps 49A, as shown in FIG. 14, and each local flap 49A is shaped to fit over the bolts 120 securing two adjacent combustion chamber segments 58 or 60 to the radially inner flange 43A or radially outer flange 43B and the hooks 70, 74 of the two adjacent combustion chamber segments 58 or 60. These arrangements allow the cowl 47 to be removed without disassembling the combustion chamber segments 58, 60 from the upstream end wall 43 and enable in-service replacement and or repair of upstream end wall accessories, e.g. heat shield segments 45, fuel injector seals etc. The nuts 134 may be captive nuts for example nuts riveted to the flanges 43A and 43B of the upstream end wall 43.

The edges of the combustion chamber segments are S shaped, but may be W shaped or straight, e.g. the edges of the combustion chamber segments may extend with a purely axial component from the upstream end to the downstream end of the combustion chamber segment or the edges of the combustion chamber segments may extend with axial and circumferential component from the upstream end to the downstream end of the combustion chamber segment.

The apertures 69 in the outer wall 64 provide impingement cooling of the inner wall 66 and that the apertures 67 in the inner wall 66 provide effusion cooling of the inner wall 66. The effusion cooling apertures 67 may be angled at an acute angle to the inner surface of the inner wall 66 and apertures 67 may be fan shaped. Other cooling arrangements may be possible for the combustion chamber segments 58 and 60, e.g. a cellular structure may be provided between the inner and outer walls.

The combustion chamber segments 58, 60 may be cylindrical, frusto-conical or have a curved profile when viewed in axial cross-section through an annular combustion chamber.

An advantage of the present disclosure is that there is a relatively large surface area of engagement between the radially inner downstream ring structure and the combustion chamber segments forming the radially inner annular wall of the annular combustion chamber and there is a relatively large surface area of engagement between the radially outer downstream ring structure and the combustion chamber segments forming the radially outer annular wall of the annular combustion chamber to provide radial restraint of the combustion chamber segments. This is of particular advantage during ultimate load situations, e.g. during compressor surge or combustion chamber flame out, when relatively high radial loads are exerted onto the combustion chamber segments tending to force the combustion chamber segments of the radially outer annular wall of the annular combustion chamber radially outwardly and to force the combustion chamber segments of the radially inner annular wall of the annular combustion chamber radially inwardly.

Another advantage of the present disclosure is that it allows for differential thermal expansion and/or contraction between the combustion chamber segments and the corresponding downstream ring structure without inducing relatively stresses in the combustion chamber segments and/or the corresponding downstream ring structure.

A further benefit is that the combustion chamber loads are transmitted into the frame structure of the combustion chamber segments and not into the inner wall and/or outer wall of the combustion chamber segments.

An additional benefit is that the combustion chamber segments are removably secured to the corresponding downstream ring structure which allows the combustion chamber segments to be repaired, or replaced. Thus, the combustion chamber segments may have a shorter working life than the corresponding downstream ring structure.

An advantage of the present disclosure is that the fasteners at the upstream ends of the combustion chamber segments radially and axially restrain the combustion chamber segments relative to the upstream end wall of the combustion chamber during normal operation and also during ultimate load situations, e.g. during compressor surge or combustion chamber flame out, when relatively high radial loads are exerted onto the combustion chamber segments tending to force the combustion chamber segments of the radially outer annular wall of the annular combustion chamber radially outwardly and to force the combustion chamber segments of the radially inner annular wall of the annular combustion chamber radially inwardly.

A further benefit is that the fasteners at the upstream ends of the combustion chamber segments allow the combustion chamber segments to be removed from the upstream end wall of the combustion chamber and replaced if the combustion chamber segments are damaged or to be repaired and reinserted into the combustion chamber.

Another benefit of the fastener arrangement is that there are low stresses in the portions of the combustion chamber segments which have cooling arrangements.

Although the present disclosure has referred to an annular combustion chamber in which combustion chamber segments form a radially outer annular wall and combustion chamber segments form a radially inner annular wall it is equally applicable to an annular combustion chamber in which combustion chamber segments only form a radially outer annular wall or to an annular combustion chamber in which combustion chamber segments only form a radially inner annular wall.

Although the present disclosure has referred to combustion chamber segments comprising an integral frame, an inner wall and an outer wall it is equally possible for the combustion chamber segments to comprise an integral frame and an inner wall.

Although the present disclosure has referred to an annular combustion chamber in which combustion chamber segments form a radially outer annular wall and combustion chamber segments form a radially inner annular it is equally applicable to a tubular combustion chamber.

Although the present disclosure has referred to providing bolt holes in the frame at the downstream ends of the combustion chamber segments with the same diameter and two sets of apertures in the associated downstream ring structure in which the holes of the first and second holes are arranged circumferentially alternatively around the ring and in which the bolt holes of one set have the same diameter as the bolt holes in the combustion chamber segments and the bolt holes of the other set are circumferentially slotted, it is equally possible to have the opposite arrangement. In the opposite arrangement all the bolt holes in the downstream ring structure have same diameter and each combustion chamber segment has a first bolt hole and a second bolt hole in the frame structure of the combustion chamber segment and each first bolt hole has the same diameter as the diameter of the bolt holes in the downstream ring structure and each second bolt hole is circumferentially slotted.

Although the description has referred to the use of bolts and threaded holes or bolts and threaded inserts to removably secure the combustion chamber segments to the radially inner and radially outer downstream ring structures other suitable fasteners may be used, e.g. nuts and bolts, screws, rivets, pins and clips.

Although the description has referred to the use of nuts and bolts to removably secure the radially inner and radially outer downstream ring structures to the inner and outer combustion chamber casings other suitable fasteners may be used, e.g. bolts and threaded holes, bolts and threaded inserts, screws, rivets, pins and clips.

Although the description has referred to the use of bolts and nuts to removably secure the combustion chamber segments to the radially inner and radially outer upstream ring structures other suitable fasteners may be used, e.g. screws, rivets, pins and clips.

The combustion chamber may be a gas turbine engine combustion chamber.

The gas turbine engine may be an aero gas turbine engine, a marine gas turbine engine, an industrial gas turbine engine or an automotive gas turbine engine.

The aero gas turbine engine may be a turbofan gas turbine engine, a turbojet gas turbine engine, a turbo propeller gas turbine engine or a turbo shaft gas turbine engine.

A method of assembling an annular combustion chamber assembly according to the present disclosure is shown in FIGS. 15 to 21. The annular combustion chamber 15 comprises an annular upstream end wall 43, a radially outer annular wall 42, a radially inner annular wall 40, a first radially outer downstream ring structure 56 and a second radially inner downstream ring structure 54 and the first ring 56 having a greater diameter than the second ring 54. The radially outer annular wall 42 comprises a plurality of first combustion chamber segments 60 and the radially inner annular wall 40 comprises a plurality of second combustion chamber segments 58.

The method comprises a first step, as shown in FIG. 15, of positioning the second combustion chamber segments 58 circumferentially side by side to form an annulus, removably securing the downstream end of each second combustion chamber segment 58 to the second ring 54 to form a first assembly 140. The first step comprises removably fastening each second combustion chamber segment 58 to the second ring 54 for example by bolting each second combustion chamber segment 58 to the second ring 54. As mentioned previously each second combustion chamber segment 58 has two bolt holes 86 and the second ring 54 has a plurality of first bolt holes 94A and plurality of second bolt holes 94B arranged alternately circumferentially around the second ring 54. Each second combustion chamber segment 68 comprises a rigid frame, the rigid frame has a first hook at a first circumferential end of the second combustion chamber segment 58 and a second hook at a second circumferential end of the second combustion chamber segment 58, the first hook extends circumferentially away from the second combustion chamber segment 58, the second hook forms a slot with the frame. The first step comprises positioning the first hook of each second combustion chamber segment 58 into the slot of a circumferentially adjacent second combustion chamber segment 58. The first step may comprise moving the second combustion chamber segments 58 axially and/or circumferentially such that the first hook of each second combustion chamber segment 55 locates into the slot of a circumferentially adjacent second combustion chamber segment 58. The frame of each second combustion chamber segment 58 has a circumferentially extending slot at a downstream axial end of the frame and the second ring 54 has an annular axially extending projection. The first step comprises positioning the slot of each second combustion chamber segment 58 on the annular axially extending projection of the second ring 54. The downstream ends of the second combustion chamber segments 58 are abutted axially against the second ring 54 and then bolts are inserted through the bolt holes 94A and 94B in the second ring 54 and into the bolt holes 86 in the downstream ends of the second combustion chamber segments 58 and hand tightened to secure the second combustion chamber segments 58 onto the second ring 54.

Figure 16:
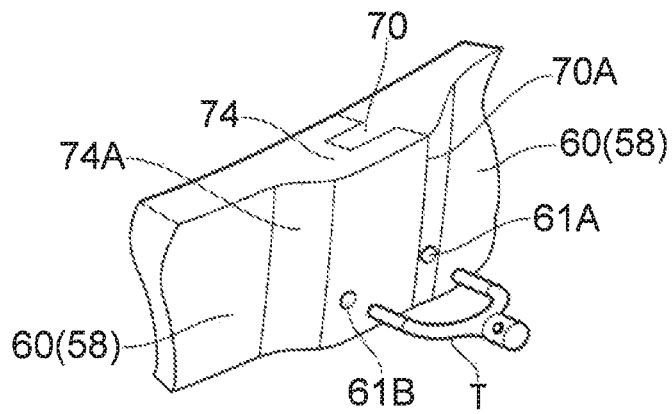
FIG. 16 is a perspective view of portions of the edges of two adjacent combustion chamber segments shown in FIG. 3.

Each second combustion chamber segment 58 has two longitudinally spaced features, grooves or holes, 61A on the surface 70A of the first hook 70 facing the second hook 74 and also has two longitudinally spaced features, grooves or holes, 61B on the surface 74A of the second hook 74 facing the first hook 70 and the features, grooves or holes, 61A and 61B are provided at the same longitudinal positions on the surfaces 70A and 74A of the first and second hooks 60 and 74 respectively, as shown in FIG. 16. Forked tools T are inserted into these longitudinally spaced features 61A and 61B of circumferentially adjacent second combustion chamber segments 68 to pull the adjacent second combustion chamber segments 58 together and to pull the upstream ends of the second combustion chamber segments 58 to a diameter less than the diameter of the flange 43B of the upstream end wall 43, as shown in FIG. 16. Alternatively, other types of tool may be used, e.g. pliers.

The method comprises a second step, as shown in FIG. 17, of removably securing the upstream end of each second combustion chamber segment 58 of the first assembly 140 to the annular upstream end wall 43. The second step comprises removably fastening each second combustion chamber segment 58 to the annular upstream end wall 43 for example by bolting each second combustion chamber segment 58 to the annular upstream end wall 43. Bolts are inserted through the bolt holes 118 in the upstream ends of the second combustion chamber segments 58 and through the bolt holes 116A and 16B in the radially outer annular flange 43B of the upstream end wall 43 and nuts are placed on the bolts and loosely assembled. The forked tools T are then removed from the second combustion chamber segments 58 and the bolts and nuts are hand tightened to secure the second combustion chamber segments 58 onto the flange 43B of the upstream end wall 43. Finally, all the bolts at the upstream and downstream ends of the second combustion chamber segments 58 are torque tightened.

The annular upstream end wall has a plurality of circumferentially spaced fuel Injector apertures 46. The method comprises a third step, as shown in FIG. 18, of providing a plurality of heat shield segments 45, each heat shield segment 45 having an aperture, aligning the aperture of each heat shield segment 45 with a respective one of the fuel injector apertures 46 in the annular upstream end wall 43 and removably securing each heat shield segment 45 to the annular upstream end wall 43. The third step comprises removably fastening each heat shield segment 45 to the annular upstream end wall 43 for example by bolting each heat shield segment 45 to the annular upstream end wall 43. The heat shield segments 45 are assembled onto the upstream end wall 43 from the downstream side of the upstream end wall 43. In particular fixing studs of the heat shield segments 45 are inserted in an axially upstream direction through apertures in the upstream end wall 43 and nuts are provided on the inserted studs and tightened. Other accessories may also be removably secured to the upstream end wall 43 during the third step, for example seals which locate in the fuel injector apertures in the upstream end wall 43 and heat shield segments 45. The third step may be performed before the second step or after the second step.

The method comprises a fourth step, as shown in FIG. 19, of positioning the first combustion chamber segments 60 circumferentially side by side to form an annulus and removably securing the downstream end of each first combustion chamber segment 60 to the first ring 56 to form a second assembly 142. The fourth step comprises removably fastening each first combustion chamber segment 60 to the first ring 58 for example by bolting each first combustion chamber segment 60 to the first ring 54. As mentioned previously, each first combustion chamber segment 60 comprise a rigid frame, the rigid frame has a first hook at a first circumferential end of the first combustion chamber segment 60 and a second hook at a second circumferential end of the first combustion chamber segment 60, the first hook extends circumferentially away from the first combustion chamber segment 60 and the second hook forms a slot with the frame. The fourth step comprises positioning the first hook of each first combustion chamber segment 80 into the slot of a circumferentially adjacent first combustion chamber segment 60. The fourth step may comprise moving the first combustion chamber segments 60 axially and/or circumferentially such that the first hook of each first combustion chamber segment 60 locates into the slot of a circumferentially adjacent first combustion chamber segment 60. The frame of each first combustion chamber segment 60 has a circumferentially extending slot at a downstream axial end of the frame and the first ring 56 has an annular axially extending projection. The fourth step comprises positioning the slot of each first combustion chamber segment 60 on the annular axially extending projection of the first ring 58. The downstream ends of the first combustion chamber segments 60 are abutted axially against the first ring 36 and then bolts are inserted through the bolt holes 94A and 94B in the first ring 56 and into the bolt holes 86 in the downstream ends of the first combustion chamber segments 60 and hand tightened to secure the first combustion chamber segments 60 onto the first ring 56.

Each first combustion chamber segment 60 has two longitudinally spaced features, grooves or holes, 61A on the surface 70A of the first hook 70 facing the second hook 74 and also has two longitudinally spaced features, grooves or holes, 61B on the surface 74A of the second hook 74 facing the first hook 70 and the features, grooves or holes, 61A, 61B are provided at the same longitudinal positions on the surfaces 70A, 74A of the first and second hooks 70 and 74, as shown in FIG. 16. Forked tools T are inserted into these longitudinally spaced features of circumferentially adjacent first combustion chamber segments 60 to align the adjacent first combustion chamber segments 60 together and to move the upstream ends of the first combustion chamber segments 60 to a diameter greater than the diameter of the flange 43A of the upstream end wall 43, as shown in FIG. 16. Alternatively, other types of tool may be used, e.g. pliers.

Figure 20:
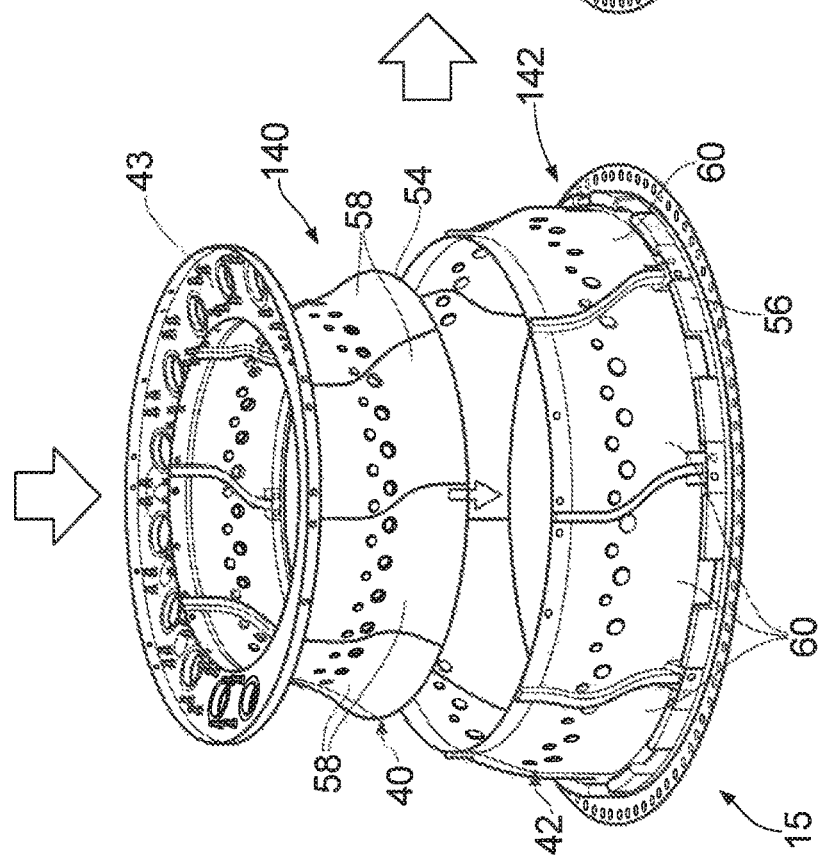
FIG. 20 shows a fifth step in a method of assembling an annular combustion chamber according to the present disclosure.

The method comprises a fifth step, as shown in FIG. 20, of inserting the first assembly 140 into the second assembly 142, and the fifth step comprises removably securing the upstream end of each first combustion chamber segment 60 of the second assembly 142 to the annular upstream end wall 43 to form the annular combustion chamber 15. The fifth step comprises removably fastening each first combustion chamber segment 60 to the annular upstream end wall 43 for example by bolting each first combustion chamber segment 80 to the annular upstream end wall 43. Bolts are inserted through the bolt holes 118 in the upstream ends of the first combustion chamber segments 60 and through the bolt holes 116A and 116B in the flange 433 of the upstream end wall 43 and nuts are placed on the bolts and loosely assembled. The forked tools T are then removed from the first combustion chamber segments 60. The axial distance between the downstream ends of the first and second rings 56 and 54 to the fuel injector apertures in the upstream end wall 43 is set and then the bolts and nuts are hand tightened to secure the first combustion chamber segments 60 onto the flange 43B of the upstream end wall 43. Finally, all the bolts at the upstream and downstream ends of the first combustion chamber segments 60 are torque tightened.

Figure 21:
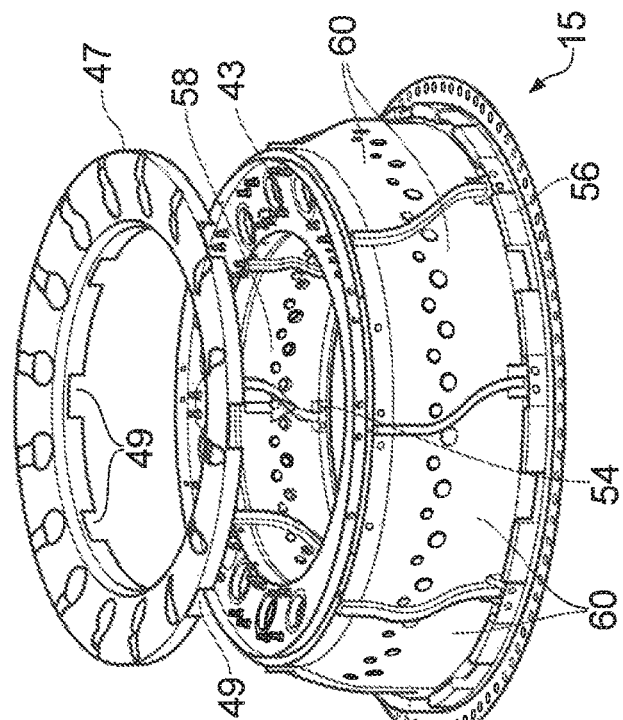
FIG. 21 shows a sixth step in a method of assembling an annular combustion chamber according to the present disclosure.

The method may comprise a sixth step, as shown in FIG. 21, of removably securing an annular cowl to the upstream end wall 43. The sixth step comprises removably fastening the annular cowl to the annular upstream end wall 43 for example by bolting the annular cowl to the radially inner annular flange 43A and the radially outer annular flange 43B of the annular upstream end wall 43. The sixth step comprises inserting bolts through the bolt holes in the annular cowl, bolt holes in the upstream ends of the second combustion chamber segments 58 and bolt holes in the radially inner annular flange 43A and by inserting bolts through the bolt holes in the annular cowl, bolt holes in the upstream ends of the first combustion chamber segments 60 and bolt holes in the radially outer annular flange 43B and then nuts are placed on the bolts and hand tightened or the nuts may be captive nuts riveted to the radially inner and outer annular flanges 43B and 43A.

An alternative method comprises a first step of positioning the first combustion chamber segments 60 circumferentially side by side to form an annulus and removably securing the downstream end of each first combustion chamber segment 60 to the first ring 56 to form a second assembly 142. The first step comprises removably fastening each first combustion chamber segment 60 to the first ring 56 for example by bolting each first combustion chamber segment 60 to the first ring 54. As mentioned previously, each first combustion chamber segment 60 comprise a rigid frame, the rigid frame has a first hook at a first circumferential end of the first combustion chamber segment 60 and a second hook at a second circumferential end of the first combustion chamber segment 60, the first hook extends circumferentially away from the first combustion chamber segment 60 and the second hook forms a slot with the frame. The first step comprises positioning the first hook of each first combustion chamber segment 60 into the slot of a circumferentially adjacent first combustion chamber segment 60. The first step may comprise moving the first combustion chamber segments 60 axially and/or circumferentially such that the first hook of each first combustion chamber segment 60 locates into the slot of a circumferentially adjacent first combustion chamber segment 60. The frame of each first combustion chamber segment 60 has a circumferentially extending slot at a downstream axial end of the frame and the first ring 56 has an annular axially extending projection. The first step comprises positioning the slot of each first combustion chamber segment 60 on the annular axially extending projection of the first ring 56. The downstream ends of the first combustion chamber segments 60 are abutted axially against the first ring 56 and then bolts are inserted through the bolt holes 94A and 94B in the first ring 56 and into the bolt holes 86 in the downstream ends of the first combustion chamber segments 60 and hand tightened to secure the first combustion chamber segments 60 onto the first ring 56.

Each first combustion chamber segment 60 has two longitudinally spaced features, grooves or holes, on the surface of the first hook facing the second hook and also has two longitudinally spaced features, grooves or holes, on the surface of the second hook facing the first hook and the features, grooves or holes, are provided at the same longitudinal positions on the surfaces of the first and second hooks. Forked tools are inserted into these longitudinally spaced features of circumferentially adjacent first combustion chamber segments 60 to align the adjacent first combustion chamber segments 60 together and to move the upstream ends of the first combustion chamber segments 60 to a diameter greater than the diameter of the flange 43A of the upstream end wall 43.

The method comprises a second step of removably fastening each first combustion chamber segment 60 to the annular upstream end wall 43 for example by bolting each first combustion chamber segment 60 to the annular upstream end wall 43. Bolts are inserted through the bolt holes 118 in the upstream ends of the first combustion chamber segments 60 and through the bolt holes 116A and 116B in the flange 43A of the upstream end wall 43 and nuts are placed on the bolts and loosely assembled. The forked tools are then removed from the first combustion chamber segments 60 and then the bolts and nuts are hand tightened to secure the first combustion chamber segments 60 onto the flange 43A of the upstream end wall 43. Finally, all the baits at the upstream and downstream ends of the first combustion chamber segments 60 are torque tightened.

The annular upstream end wall has a plurality of circumferentially spaced fuel injector apertures 46. The method comprises a third step of providing a plurality of heat shield segments 45, each heat shield segment 45 having an aperture, aligning the aperture of each heat shield segment 45 with a respective one of the fuel injector apertures 46 in the annular upstream end wall 43 and removably securing each heat shield segment 45 to the annular upstream end wall 43. The third step comprises removably fastening each heat shield segment 45 to the annular upstream end wall 43 for example by bolting each heat shield segment 45 to the annular upstream end wall 43. The heat shield segments 45 are assembled onto the upstream end wall 43 from the downstream side of the upstream end wall 43. In particular fixing studs of the heat shield segments 45 are inserted in an axially upstream direction through apertures in the upstream end wall 43 and nuts are provided on the inserted studs and tightened. Other accessories may also be removably secured to the upstream end wall 43 during the third step, for example seals which locate in the fuel injector apertures in the upstream end wall 43 and heat shield segments 45. The third step may be performed before the second step or after the second step.

The method comprises a fourth step of positioning the second combustion chamber segments 58 circumferentially side by side to form an annulus, removably securing the downstream end of each second combustion chamber segment 58 to the second ring 54 to form a first assembly 140.

The fourth step comprises removably fastening each second combustion chamber segment 58 to the second ring 54 for example by bolting each second combustion chamber segment 68 to the second ring 54. As mentioned previously each second combustion chamber segment 58 has two bolt holes 86 and the second ring 54 has a plurality of first bolt holes 94A and plurality of second bolt holes 94B arranged alternately circumferentially around the second ring 54. Each second combustion chamber segment 58 comprises a rigid frame, the rigid frame has a first hook at a first circumferential end of the second combustion chamber segment 58 and a second hook at a second circumferential end of the second combustion chamber segment 58, the first hook extends circumferentially away from the second combustion chamber segment 58, the second hook forms a slot with the frame. The fourth step comprises positioning the first hook of each second combustion chamber segment 58 into the slot of a circumferentially adjacent second combustion chamber segment 58. The fourth step may comprise moving the second combustion chamber segments 58 axially and/or circumferentially such that the first hook of each second combustion chamber segment 58 locates into the slot of a circumferentially adjacent second combustion chamber segment 58. The frame of each second combustion chamber segment 58 has a circumferentially extending slot at a downstream axial end of the frame and the second ring 54 has an annular axially extending projection. The fourth step comprises positioning the slot of each second combustion chamber segment 58 on the annular axially extending projection of the second ring 54. The downstream ends of the second combustion chamber segments 58 are abutted axially against the second ring 54 and then bolts are inserted through the bolt holes 94A and 94B in the second ring 54 and into the bolt holes 86 in the downstream ends of the second combustion chamber segments 58 and hand tightened to secure the second combustion chamber segments 58 onto the second ring 54.

Each second combustion chamber segment 58 has two longitudinally spaced features, grooves or holes, on the surface of the first hook facing the second hook and also has two longitudinally spaced features, grooves or holes, on the surface of the second hook facing the first hook and the features, grooves or holes, are provided at the same longitudinal positions on the surfaces of the first and second hooks. Forked tools are inserted into these longitudinally spaced features of circumferentially adjacent second combustion chamber segments 58 to pull the adjacent second combustion chamber segments 58 together and to pull the upstream ends of the second combustion chamber segments 58 to a diameter less than the diameter of the flange 43A of the upstream end wall 43.

The method comprises a fifth step of inserting the first assembly 140 into the second assembly 142, and the fifth step comprises removably securing the upstream end of each second combustion chamber segment 58 of the first assembly 140 to the annular upstream end wall 43 to form the annular combustion chamber 15. The fifth step comprises removably fastening each second combustion chamber segment 58 to the annular upstream end wall 43 for example by bolting each second combustion chamber segment 58 to the annular upstream end wall 43. Bolts are inserted through the bolt holes 118 in the upstream ends of the second combustion chamber segments 58 and through the bolt holes 116A and 116B in the flange 43A of the upstream end wall 43 and nuts are placed on the bolts and loosely assembled. The forked tools are then removed from the second combustion chamber segments 58 and the bolts and nuts are hand tightened. The axial distance between the downstream ends of the first and second rings 56 and 54 to the fuel injector apertures in the upstream end wall 43 is set to secure the second combustion chamber segments 58 onto the flange 43A of the upstream end wall 43. Finally, all the bolts at the upstream and downstream ends of the second combustion chamber segments 58 are torque tightened.

The method may comprise a sixth step of removably securing an annular cowl to the upstream end wall 43. The sixth step comprises removably fastening the annular cowl to the annular upstream end wall 43 for example by bolting the annular cowl to the radially inner annular flange 43A and the radially outer annular flange 436 of the annular upstream end wall 43. The sixth step comprises inserting bolts through the bolt holes in the annular cowl, bolt holes in the upstream ends of the second combustion chamber segments 58 and bolt holes in the radially inner annular flange 43A and by inserting bolts through the bolt holes hi the annular cowl, bolt holes in the upstream ends of the first combustion chamber segments 60 and bolt holes in the radially outer annular flange 436 and then nuts are placed on the bolts and hand tightened or the nuts may be captive nuts riveted to the radially inner and outer annular flanges 436 and 43A.

The method may comprise a seventh step of removably securing the first ring 56 to an outer combustion chamber casing 110 and removably securing the second ring 64 to an inner combustion chamber casing 112 or removably securing the second ring 54 to an radially inner discharge nozzle. The method may comprise a seventh step of removably securing the first ring to an radially outer discharge nozzle and removably securing the second ring to an inner combustion chamber casing or removably securing the second ring to an radially inner discharge nozzle.

It is to be noted that the first ring, the radially outer downstream ring structure, 56 is a separate structure to the upstream end wall 43 and the second ring, the radially inner downstream ring structure, 54 is a separate structure to the upstream end wall, upstream ring structure, 43.

A further method comprises a first step of positioning the second combustion chamber segments 60 circumferentially side by side to form an annulus and removably securing the downstream end of each second combustion chamber segment 60 to the second ring 54 to form a second assembly 142, as described previously. The method comprises a second step of positioning the first combustion chamber segments 58 circumferentially side by side to form an annulus, removably securing the downstream end of each first combustion chamber segment 58 to the first 54 to form a first assembly 140, as described previously. The method comprises a third step of removably fastening each heat shield segment 45 to the annular upstream end wall 43 for example by bolting each heat shield segment 45 to the annular upstream end wall 43 and positioning the seals in the fuel injector apertures, as described previously. The method comprises a fourth step of inserting the first assembly 140 into the second assembly 142. The method comprises a fifth step of removably securing the upstream end of each first combustion chamber segment of the first assembly 140 to the annular upstream end wall 143 and removably securing the upstream end of each second combustion chamber segment of the second assembly 142 to the annular upstream end wall. The fifth step comprises positioning the annular upstream end wall 143 between the upstream end of each second combustion chamber segment of the second assembly 142 and the upstream end of each first combustion chamber segment of the first assembly 140.

An advantage of the method of assembling the combustion chamber assembly is that it enables the heat shield segments and seals for the fuel injectors etc. to be assembled onto the upstream end wall more easily reducing assembly time and costs. The first method provides easier access than the second method.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of assembling an annular combustion chamber, the annular combustion chamber including an annular upstream end wall, a radially outer annular wall, a radially inner annular wall, a first ring and a second ring, the first ring having a greater diameter than a diameter of the second ring, the radially outer annular wall including a plurality of first combustion chamber segments and the radially inner annular wall including a plurality of second combustion chamber segments, each first combustion chamber segment of the plurality of first combustion chamber segments includes a rigid frame, the rigid frame has a first hook at a first circumferential end of each first combustion chamber segment and a second hook at a second circumferential end of each first combustion chamber segment, the first hook extends circumferentially away from each first combustion chamber segment, the second hook forms a slot with the rigid frame, the method comprising steps of:
   a) positioning the plurality of first combustion chamber segments circumferentially side by side to form an annulus and removably securing a downstream end of each first combustion chamber segment of the plurality of first combustion chamber segments to the first ring to form a first assembly, and positioning the first hook of each first combustion chamber segment into the slot of a circumferentially adjacent first combustion chamber segment,
   b) aligning an aperture of each of a plurality of heat shield segments with a respective one of a plurality of injector apertures located in the annular upstream end wall, and removably securing each of the plurality of heat shield segments to the annular upstream end wall on a downstream side of the annular upstream end wall,
   c) removably securing an upstream end of each first combustion chamber segment of the first assembly to the annular upstream end wall,
   d) positioning the second combustion chamber segments circumferentially side by side to form an annulus, removably securing a downstream end of each second combustion chamber segment of the plurality of second combustion chamber segments to the second ring to form a second assembly, and positioning the first hook of each second combustion chamber segment into the slot of a circumferentially adjacent second combustion chamber segment,
   e) subsequent to (i) aligning and removably securing each of the plurality of heat shield segments to the annular upstream end wall, and (ii) forming the second assembly, inserting the second assembly into the first assembly, and
   f) removably securing an upstream end of each second combustion chamber segment of the second assembly to the annular upstream end wall.

2. The method as claimed in claim 1, further comprising removably securing the upstream end of each second combustion chamber segment of the second assembly to the annular upstream end wall before locating the second assembly into the first assembly, and removably securing the upstream end of each first combustion chamber segment of the first assembly to the annular upstream end wall after locating the second assembly into the first assembly to form the annular combustion chamber.

3. The method as claimed in claim 1, further comprising removably securing the upstream end of each first combustion chamber segment of the first assembly to the annular upstream end wall before locating the second assembly into the first assembly, and removably securing the upstream end of each second combustion chamber segment of the second assembly to the annular upstream end wall after locating the second assembly into the first assembly to form the annular combustion chamber assembly.

4. The method as claimed in claim 1, further comprising:
   removably securing the heat shields to the annular upstream end wall before removably securing the upstream end of each second combustion chamber segment of the second assembly to the annular upstream end wall,
   removably securing the upstream end of each second combustion chamber segment of the second assembly to the annular upstream end wall before locating the second assembly into the first assembly, and
   removably securing the upstream end of each first combustion chamber segment of the first assembly to the annular upstream end wall after locating the second assembly into the first assembly to form the annular combustion chamber.

5. The method as claimed in claim 1, further comprising:
   removably securing the upstream end of each second combustion chamber segment of the second assembly to the annular upstream end wall before removably securing the heat shields to the annular upstream end wall,
   removably securing the heat shields to the annular upstream end wall before locating the second assembly into the first assembly, and
   removably securing the upstream end of each first combustion chamber segment of the first assembly to the annular upstream end wall after locating the second assembly into the first assembly to form the annular combustion chamber.

6. The method as claimed in claim 1, further comprising:
   removably securing the heat shields to the annular upstream end wall before locating the second assembly within the first assembly,
   removably securing the upstream end of each second combustion chamber segment of the second assembly to the annular upstream end wall, and
   removably securing the upstream end of each first combustion chamber segment of the first assembly to the annular upstream end wall after locating the second assembly within the first assembly.

7. The method as claimed in claim 1, wherein step a) includes moving the first combustion chamber segments axially or circumferentially such that the first hook of each first combustion chamber segment is inserted into the slot of a circumferentially adjacent first combustion chamber segment.

8. The method as claimed in claim 1, wherein each first combustion chamber segment includes an inner wall and an outer wall spaced from the inner wall, the rigid frame surrounding the inner wall and the outer wall, and the rigid frame, the inner wall, and the outer wall being an integral structure.

9. The method as claimed in claim 1, wherein step b) includes moving the second combustion chamber segments axially or circumferentially such that the first hook of each second combustion chamber segment is inserted into the slot of a circumferentially adjacent second combustion chamber segment.

10. The method as claimed in claim 1, wherein each second combustion chamber segment includes an inner wall and an outer wall spaced from the inner wall, the rigid frame surrounding the inner wall and the outer wall, and the rigid frame, the inner wall, and the outer wall being an integral structure.

11. The method as claimed in claim 1, wherein:
the rigid frame of each first combustion chamber segment has a circumferentially extending slot at a first axial end of the rigid frame and the first ring has an annular axially extending projection, and
step a) includes positioning the circumferentially extending slot of each first combustion chamber segment on the annular axially extending projection of the first ring.

12. The method as claimed in claim 1, wherein:
the rigid frame of each second combustion chamber segment has a circumferentially extending slot at a first axial end of the rigid frame and the second ring has an annular axially extending projection, and
step d) includes positioning the circumferentially extending slot of each second combustion chamber segment on the annular axially extending projection of the second ring.

13. The method as claimed in claim 1, further comprising removably securing an annular cowl to the upstream end wall.

14. The method as claimed in claim 1, wherein step a) is performed before step d).

15. The method as claimed in claim 1, wherein step d) is performed before step a).

16. A method of assembling an annular combustion chamber, the annular combustion chamber including an annular upstream end wall, a radially outer annular wall, a radially inner annular wall, a first ring and a second ring, the first ring having a greater diameter than a diameter of the second ring, the radially outer annular wall including a plurality of first combustion chamber segments and the radially inner annular wall including a plurality of second combustion chamber segments, each first combustion chamber segment of the plurality of first combustion chamber segments includes a rigid frame, the rigid frame has a first hook at a first circumferential end of each first combustion chamber segment and a second hook at a second circumferential end of each first combustion chamber segment, the first hook extends circumferentially away from each first combustion chamber segment, the second hook forms a slot with the rigid frame, the method comprising steps of:
a) positioning the plurality of first combustion chamber segments circumferentially side by side to form an annulus, removably securing a downstream end of each first combustion chamber segment to the first ring to form a first assembly, and positioning the first hook of each first combustion chamber segment into the slot of a circumferentially adjacent first combustion chamber segment, and positioning the plurality of second combustion chamber segments circumferentially side by side to form an annulus, removably securing a downstream end of each second combustion chamber segment to the second ring and removably securing an upstream end of each second combustion chamber segment to the upstream end wall to form a second assembly, and positioning the first hook of each second combustion chamber segment into the slot of a circumferentially adjacent second combustion chamber segment, or
positioning the plurality of first combustion chamber segments circumferentially side by side to form an annulus, removably securing the downstream end of each first combustion chamber segment to the first ring and removably securing the upstream end of each first combustion chamber segment to the upstream end wall to form a first assembly, and positioning the first hook of each first combustion chamber segment into the slot of the circumferentially adjacent first combustion chamber segment, and positioning the plurality of second combustion chamber segments circumferentially side by side to form an annulus and removably securing the downstream end of each second combustion chamber segment to the second ring to form a second assembly, and positioning the first hook of each second combustion chamber segment into the slot of a circumferentially adjacent second combustion chamber segment, b) aligning an aperture of each of a plurality of heat shield segments with a respective one of a plurality of injector apertures located in the annular upstream end wall, and removably securing each of the plurality of heat shield segments to the annular upstream end wall on a downstream side of the annular upstream end wall, c) removably securing an upstream end of each first combustion chamber segment of the first assembly to the annular upstream end wall, d) subsequent to (i) aligning and removably securing each of the plurality of heat shield segments to the annular upstream end wall, and (ii) forming the second assembly, inserting the second assembly into the first assembly, and e) removably securing the upstream end of each first combustion chamber segment of the first assembly to the annular upstream end wall to form the annular combustion chamber or removably securing the upstream end of each second combustion chamber segment of the second assembly to the annular upstream end wall to form the annular combustion chamber.

17. A method of assembling an annular combustion chamber, the annular combustion chamber including an annular upstream end wall, a radially outer annular wall, a radially inner annular wall, a first ring and a second ring, the first ring having a greater diameter than a diameter of the second ring, the radially outer annular wall including a plurality of first combustion chamber segments and the radially inner annular wall including a plurality of second combustion chamber segments, the method comprising steps of:
a) positioning the plurality of first combustion chamber segments circumferentially side by side to form an annulus and removably securing a downstream end of each first combustion chamber segment of the plurality of first combustion chamber segments to the first ring to form a first assembly, b) positioning the plurality of second combustion chamber segments circumferentially side by side to form an annulus and removably securing a downstream end of each second combustion chamber segment of the plurality of second combustion chamber segments to the second ring to form a second assembly, c) aligning an aperture of each of a plurality of heat shield segments with a respective one of a plurality of fuel injector apertures located in the annular upstream end wall, and removably securing each of the plurality of heat shield segments to the annular upstream end wall on a downstream side of the annular upstream end wall, d) removably securing an upstream end of each second combustion chamber segment of the second assembly to the annular upstream end wall, and e) subsequent to (i) aligning and removably securing each of the plurality of heat shield segments to the annular upstream end wall, and (ii) forming the first assembly, inserting the second assembly into the first assembly, and f) removably securing an upstream end of each first combustion chamber segment of the first assembly to the annular upstream end wall.

18. A method of assembling an annular combustion chamber, the annular combustion chamber including an annular upstream end wall, a radially outer annular wall, a radially inner annular wall, a first ring and a second ring, the first ring having a greater diameter than a diameter of the second ring, the radially outer annular wall including a plurality of first combustion chamber segments and the radially inner annular wall comprising a plurality of second combustion chamber segments, each first combustion chamber segment includes a rigid frame, the rigid frame includes a first end wall, a second end wall, a first edge wall, and a second edge wall, the rigid frame has a first hook at a first circumferential end of each first combustion chamber segment and a second hook at a second circumferential end of each first combustion chamber segment, the first hook is provided on the first edge wall and the second hook is provided on the second edge wall, the first hook extends circumferentially away from each first combustion chamber segment, the second hook forms a slot with the rigid frame, and each second combustion chamber segment includes a rigid frame, the rigid frame includes a first end wall, a second end wall, a first edge wall, and a second edge wall, the rigid frame has a first hook at a first circumferential end of each second combustion chamber segment and a second hook at a second circumferential end of each second combustion chamber segment, the first hook is provided on the first edge wall and the second hook is provided on the second edge wall, the first hook extends circumferentially away from each second combustion chamber segment, the second hook forms a slot with the rigid frame, the plurality of second combustion chamber segments including an integral frame and an inner wall, the method comprising steps of:

a) positioning the first combustion chamber segments circumferentially side by side to form an annulus by positioning the first hook of each first combustion chamber segment into the slot of a circumferentially adjacent first combustion chamber segment and removably securing a downstream end of each first combustion chamber segment to the first ring to form a first assembly, b) positioning the second combustion chamber segments circumferentially side by side to form an annulus by positioning the first hook of each second combustion chamber segment into the slot of a circumferentially adjacent second combustion chamber segment and removably securing a downstream end of each second combustion chamber segment to the second ring to form a second assembly, c) inserting the second assembly into the first assembly, d) removably securing an upstream end of each second combustion chamber segment of the second assembly to the annular upstream end wall, and e) removably securing an upstream end of each first combustion chamber segment of the first assembly to the annular upstream end wall.

* * * * *